United States Patent
Otsuka

(10) Patent No.: US 8,346,994 B2
(45) Date of Patent: Jan. 1, 2013

(54) METHODS AND APPARATUS FOR PROVIDING USER LEVEL DMA AND MEMORY ACCESS MANAGEMENT

(75) Inventor: Katsushi Otsuka, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 221 days.

(21) Appl. No.: 12/631,207

(22) Filed: Dec. 4, 2009

(65) Prior Publication Data

US 2010/0161850 A1 Jun. 24, 2010

(30) Foreign Application Priority Data

Dec. 24, 2008 (JP) ................................. 2008-328251

(51) Int. Cl.
*G06F 13/28* (2006.01)

(52) U.S. Cl. ................. 710/23; 710/22; 710/26

(58) Field of Classification Search .................. None
See application file for complete search history.

(56) References Cited

U.S. PATENT DOCUMENTS

| | | | | |
|---|---|---|---|---|
| 6,567,897 | B2 * | 5/2003 | Lee et al. ...................... | 711/153 |
| 7,146,477 | B1 | 12/2006 | Strongin | |
| 7,512,761 | B2 * | 3/2009 | Kwon ........................... | 711/163 |
| 7,610,464 | B2 | 10/2009 | Otsuka | |
| 2003/0018860 | A1 * | 1/2003 | Krueger ........................ | 711/152 |
| 2004/0205203 | A1 * | 10/2004 | Peinado et al. ............... | 709/229 |
| 2006/0004983 | A1 * | 1/2006 | Tsao et al. .................... | 711/202 |
| 2007/0162641 | A1 * | 7/2007 | Oztaskin et al. .............. | 710/22 |
| 2007/0208885 | A1 * | 9/2007 | Otsuka .......................... | 710/22 |
| 2007/0283123 | A1 * | 12/2007 | Vick et al. .................... | 711/207 |
| 2008/0282342 | A1 * | 11/2008 | Hatakeyama .................. | 726/17 |
| 2010/0211752 | A1 | 8/2010 | Otsuka | |

FOREIGN PATENT DOCUMENTS

| | | |
|---|---|---|
| EP | 1708090 A2 | 10/2006 |
| EP | 1903443 A1 | 3/2008 |
| JP | 08077062 A | 3/1996 |
| JP | 200699702 A | 4/2006 |
| JP | 2009523269 T | 6/2009 |
| WO | 2007097123 A1 | 8/2007 |

OTHER PUBLICATIONS

European Search Report for corresponding application 09015503.7, dated Apr. 16, 2010.
Thornwood; "Address Translation Mechanism" IBM Technical Disclosure Bulletin, International Business Machine Corp. vol. 33, No. 11, pp. 398-399 (Apr. 1, 1991).
Office Action for corresponding JP application 2008-328251, dated Sep. 28, 2010.

* cited by examiner

*Primary Examiner* — Henry Tsai
*Assistant Examiner* — Jing-Yih Shyu
(74) *Attorney, Agent, or Firm* — Matthew B. Dernier, Esq.; Gibson & Dernier LLP

(57) ABSTRACT

A memory access control apparatus receives from a DMA requestor an access request command, which contains an IOID, for a DMA address space that is a memory area used for a DMA transfer, and determines whether the access is permitted or not and executes the access if it is permitted. The operating system on the PU sets in MMU the correspondence relationship between the logical address space of a user process and the DMA address space. When the user process instructs to access the DMA address space by specifying a logical address, the MMU translates the logical address into a physical address of the DMA address space.

6 Claims, 16 Drawing Sheets

METHODS AND APPARATUS FOR PROVIDING USER LEVEL DMA AND MEMORY ACCESS MANAGEMENT

BACKGROUND OF THE INVENTION

1. Field of the Invention

The present invention relates to technologies by which to control memory access, and it particularly relates to a technology by which to control the memory access from a user process.

2. Description of the Related Art

Along with recent years' significant advance of computer graphics technology and image processing techniques, which are utilized in the fields of computer games, digital broadcasting, and the like, there is a demand that information processing apparatuses such as computers, gaming machines, and televisions be equipped with faster processing capacity in order to process high-definition image data. To meet such demand, it goes without saying that the arithmetic process itself needs to be done at high speed. By the same token, it is important to suitably distribute the tasks among a plurality of processing units.

Each processing unit accesses memory as appropriate when tasks are to be executed. In so doing, if the access by a processing unit B to a memory area secured for the processing of a processing unit A is granted, the performance stability will be impaired. Particularly in the case of an I/O device user for controlling peripheral equipment, there are many cases where a device driver directly designates a physical address so as to control the memory. Any error in programming such a device driver may impose a serious effect on the performance stability of an information processing apparatus.

Furthermore, taking into consideration a system design in which a user process requests a device driver to control the peripheral equipment, the processing efficiency of the device driver greatly influences the overall system processing efficiency.

SUMMARY OF THE INVENTION

In this background, a general purpose of the present invention is to provide a technology by which to improve the efficiency for controlling the peripheral equipment by a user process.

One embodiment of the present invention relates to a memory access control system. This system comprises an I/O access control apparatus and a process control apparatus. The I/O access control apparatus receives from an external DMA transfer requesting entity a control command that contains an address to be accessed and an ID for identifying the DMA transfer requesting entity, the address to be accessed being in a DMA address space that is a memory area used for a DMA transfer; the I/O access control apparatus determines whether access of the area specified by the address by the DMA transfer requesting entity is permitted or not and executes the access on the condition that the access has been permitted. The process control apparatus sets a mapping table that associates a logical address space of a user process with the DMA address space; and translates a logical address into a physical address in the DMA address space when the user process instructs to access the DMA address space by specifying the logical address, so as to allow the user process to directly access the DMA address space.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
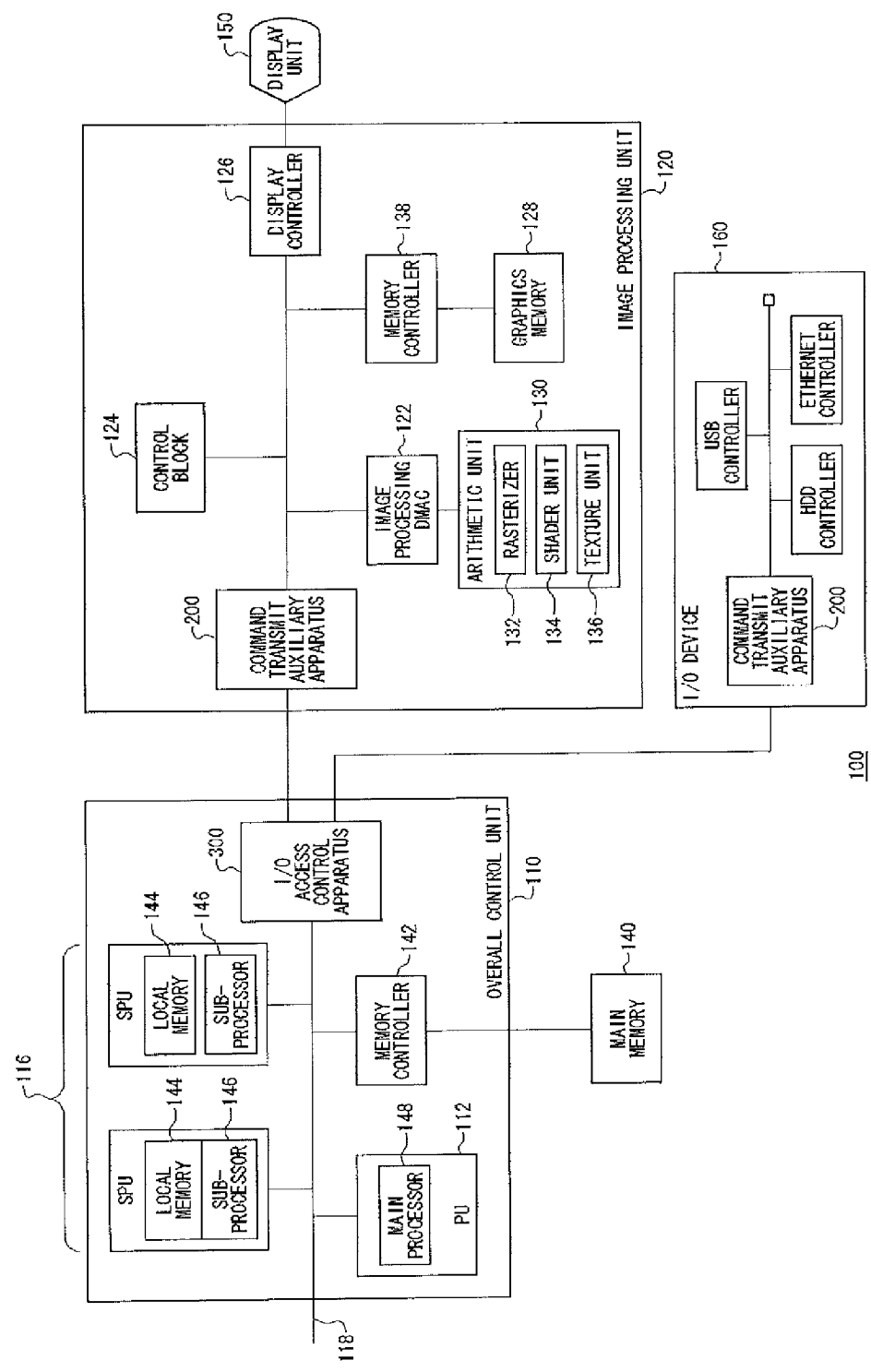
FIG. 1 is a function block diagram of an information processing apparatus according to an embodiment of the present invention.

FIG. 1 is a function block diagram of an information processing apparatus 100. The information processing apparatus 100 includes an overall control unit 110, an image processing unit 120, a main memory 140, and an I/O device 160. The information processing apparatus 100 is connected with a display unit 150. The display unit 150 outputs images and videos obtained as a result of processes performed by the overall control unit 110 and the image processing unit 120. The I/O device 160 is a device serving as an I/O interface or the like with other data processing devices such as Southbridge. In the I/O device, a universal serial bus (USB) controller, a hard disk drive (HDD) controller, an Ethernet controller, or the like are connected to a command transmit auxiliary apparatus 200 described later. As for the I/O device 160 connected with the information processing apparatus 100, there may be provided a plurality of or a plurality of types of I/O devices 160. The overall control unit 110 and the image processing unit 120 are each formed as a single-chip electronic device and are physically separated from each other. Note that the overall control unit 110 combined with the image processing unit 120 may also be formed as a single-chip electronic device.

In terms of hardware, each element described, as a function block for carrying out a wide variety of processes, as shown in FIG. 1 and the like, can be configured by a CPU (Central Processing Unit), a memory, and other LSI (Large Scale Integration). In terms of software, it is realized by memory-loaded programs or the like that have a function of reserved management. Thus, it is understood by those skilled in the art that these function blocks can be realized in a variety of forms such as by hardware only, software only, or the combination thereof and are not limited to any of these in particular.

In the information processing apparatus 100, executed is an operating system (hereinafter referred to as "OS") that provides functions and environments to efficiently use the information processing apparatus 100 and that controls the entire apparatus in a unified manner and under strict rules. Multiple applications are run on the OS. The OS in the information processing apparatus 100 according to the present embodiment contains three hierarchies (from top to bottom): a user layer, a kernel layer, and hypervisor layer. Hereinafter, software that manages the hypervisor layer will be called "privileged software". The user layer, the kernel layer, and the hypervisor layer function as the "OS" of the information processing apparatus 100 and are formed in an integrated structure.

The overall control unit 110 includes a processing unit (PU) 112, which is an example of a main control apparatus, and a plurality of synergistic-processing units (SPUs) 116, each of which being an example of a sub-control apparatus, a memory controller 142, and an I/O access control apparatus 300. The PU 112, the SPUs 116, the memory controller 142, and the I/O access control apparatus 300 can communicate with one another via a bus 118. The main memory 140 is connected with the memory controller. The information processing apparatus 100 can be connected with another information processing apparatus 100 via the bus 118.

The PU 112 allocates, to an SPU 116, a task serving as a basic unit of processing for each application. Alternatively, the PU 112 itself may execute a task. The PU 112 includes a main processor 148 as an arithmetic entity. Each SPU 116 executes a task assigned so that a plurality of tasks may be executed in parallel. The SPU 116 includes a sub-processor 146 as an arithmetic subject and a local memory 144 as a local storage area. The OS is executed by the PU 112.

A memory space, which is under management of the PU 112 in the overall control unit 110, is formed by the main memory 140 and a plurality of local memories 144. Hereinafter, such a "memory space, which is under management of the PU 112" will be simply referred to as a "management space". Though the details will be described later, a DMA transfer requesting entity such as a USB controller 160, an image processing DMAC (Direct Memory Access Controller) 122 or a display controller 126 that exists external to the overall control unit 110 can access a management space by way of the I/O access control apparatus 300. That is, the USB controller 160 and the image processing DMAC 122 execute a read/write of data to the management space via a command transmit auxiliary apparatus 200 and the I/O access control apparatus 300. Hereinafter, the a device that may access the management space from the outside of the overall control unit 110 will be called a "DMA requestor".

A process executed by the PU 112 is called a "main process", and a process executed by the SPU 116 is called a "sub-process". In this embodiment, the PU 112 may execute different types of operating systems, various types of device drivers, and/or user processes. The SPU 116 executes user processes but does not execute any operating systems or device drivers.

A DMAC, not shown in FIG. 1, included in the SPU 116 controls data transfer, data saving, and the like between a built-in graphics memory 128 in the image processing unit 120 and the main memory 140 connected via the memory controller, by a command from the PU 112 or the SPU 116.

The I/O access control apparatus 300 places all of access requesting commands from a DMA requestor under total control. Here, the access requesting command is a command requesting a write of data to a management space of the PU 112 or a command requesting a read of data in the aforementioned management space. The access requesting command will be described in detail with reference to FIG. 2. The management space of the PU 112 is mapped to the main memory 140 connected with the memory controller 142 and the local memory 144 of each SPU 116. Other storage areas, for example, a storage area of another information processing apparatus 100, may be mapped to the management space. When the DMA requestor accesses the management space of the PU 112, an access requesting command is sent to the I/O access control apparatus 300. The I/O access control apparatus 300 receives the access requesting command and then controls the read/write from/to the management space.

The main memory 140 is a storage area mapped to part of the management space. Data on the execution status of tasks are stored in the main memory 140. For instance, the coordinate data is stored temporarily after being obtained as the coordinate computation related to the computer graphics has been executed by the overall control unit 110. There are cases where the data generated by the image processing unit 120 is saved in this main memory 140. The local memory 144 is also a storage area mapped to part of the management space, and the local memory 144 principally stores working data necessary for executing the sub-processes.

A part of the main memory 140 and/or the local memory 144 will be an area for retaining data for a DMA transfer. Such an area is called the "DMA address space". The DMA address space will be formed as a part of the management space.

The image processing unit 120 is a unit that exclusively carries out image processing, for instance, image processing related to rendering. The image processing unit 120 executes image processing, following the instructions from the overall control unit 110. The image processing unit 120 carries out image processing related to the respective tasks processed by the overall control unit 110 and outputs the generated images or videos to the display apparatus 150. The image processing unit 120 may time-share and execute in parallel a plurality of image processes.

The image processing unit 120 includes a memory controller 138, a graphics memory 128, an image processing DMAC 122, an arithmetic unit 130, a display controller 126, a control block 124, and a command transmit auxiliary apparatus 200. These units are connected with one another via the bus 118, and thus these units can communicate with one another. The graphics memory 128 is connected with the bus 118 by way of the memory controller 138. The arithmetic unit 130 is connected with the bus 118 by way of the image processing DMAC 122.

The graphics memory 128 is a memory area for storing graphics data that is used and managed by the image processing unit 120. Provided in the graphics memory 128 are not only a frame buffer and a Z-buffer, where image frame data is stored, but also areas corresponding to data, such as vertex data, texture data, and color lookup table data, which is the basic data referred to during the rendering of image frame data.

The control block 124 is a block for controlling the image processing unit 120 as a whole. The control block 124 performs an overall control of the arithmetic unit 130, the graphics memory 128, and the display controller 126 and carries out synchronization management, timer management, and the like of data transfer between the respective blocks.

The image-processing-side DMAC 122 controls the data transfer, data save, and the like between the management space and the graphics memory 128, following a command from the control block 124.

The display controller 126 generates horizontal and vertical synchronization signals and loads, sequentially in a line, the pixel data of image frame data from a frame buffer stored in the graphics memory 128 according to the display ratio of the display apparatus 150. Furthermore, the display controller 126 makes an output by converting the pixel data having been loaded in a line, from the digital data comprised of RGB (Red-Green-Blue) color values, into a format corresponding to the display apparatus 150.

The arithmetic unit 130 carries out a variety of arithmetic processes concerning graphics, following the commands from the control block 124. Examples of such processes may be a series of rendering processes of generating image frame data through coordinate transformation, hidden-surface elimination, and shading based on three-dimensional modeling of data and writing data into a frame buffer.

The arithmetic unit 130 includes such function blocks as a rasterizer 132, a shader unit 134, and a texture unit 136 in order to effect high-speed processing of three-dimensional graphics in particular.

The rasterizer 132 receives vertex data of a basic object to be rendered (hereinafter referred to as "primitive") from the overall control unit 110 and performs a view transformation of converting the primitive on a three-dimensional space into graphics on a rendering plane through a projection transformation. Furthermore, the rasterizer 132 carries out a raster process of scanning the graphics on the rendering plane along the horizontal direction of the rendering plane and converting the graphs column by column into quantized pixels. The primitive is pixel-expanded by the rasterizer 132, and the pixel information is calculated for each pixel. The pixel information includes RGB color values, α values indicating transparency, and Z values indicating a depth from a viewpoint.

The rasterizer 132 generates a pixel area of a predetermined size along the scan lines and outputs the pixel area to the shader unit 134 and the texture unit 136. The pixel areas outputted from the rasterizer 132 are once stacked into a queue, and the shader unit 134 processes the stacked pixel areas one by one.

The shader unit 134 carries out a shading processing based on the pixel information calculated by the rasterizer 132, determines the pixel colors after texture mapping based on corresponding texture information obtained by the texture unit 136, and writes the image frame data after the shading processing in a frame buffer in the graphics memory 128. Furthermore, the shader unit 134 performs processes, such as fogging and alpha blending, on the image frame data written into the frame buffer, determines final rendering colors, and updates the image frame data in the frame buffer.

The texture unit 136 receives parameters specifying texture data from the shader unit 134, reads out the requested texture data from a texture buffer in the graphics memory 128, and outputs the texture data to the shader unit 134 after performing a predetermined processing thereon.

Upon receipt of basic information necessary for image generation, such as the vertex data of a primitive, or a start instruction for image generation from the overall control unit 110, the image processing unit 120 executes image processing independently of the overall control unit 110. The image processing DMAC 122 transfers the data generated by the image processing unit 120 to the graphics memory 128 and the management space.

When the DMA requestor of the image processing unit 120 transfers the data to the DMA address space, the command transmit auxiliary apparatus 200 in the image processing unit 120 transmits an access requesting command to the I/O access control apparatus 300 in the overall control unit 110, from the image processing unit 120. The command transmit auxiliary apparatus 200 transmits a logical address of the management space to be accessed, ID information to identify the DMA requestor (the ID information being hereinafter referred to as an "IOID" (Input/Output Device ID), and an access requesting command, which has been turned into a packet. In the case of a write instruction, data to be written is also transmitted following the access requesting command. The I/O access control apparatus 300 controls the access to the DMA address space from the DMA requestor according to the access requesting command received.

The command transmit auxiliary apparatus 200 is mounted not only on the image processing unit 120 but also on the I/O device 160. The command transmit auxiliary apparatus 200 mounted on the I/O device 160 also transmits an access requesting command to the overall control unit 110 from the I/O device 160. The image processing DMAC 122 or the display controller 126 serves as a DMA requestor in the image processing unit 120. The aforementioned USB controller, HDD controller, Ethernet controller, or the like serves as a DMA requestor in the I/O device 160. When various types of DMA requestors request the access to the DMA address space, the command transmit auxiliary apparatus 200 generates an access requesting command having a predetermined format and then transmits the access requesting command to the overall control unit 110. The I/O access control apparatus 300 is a device that receives access requests from various types of DMA requestors via various command transmit auxiliary apparatuses 200 and then controls accesses to the DMA address space.

A detailed description will be given of the command transmit auxiliary apparatuses 200 in FIG. 2 and onward, especially with reference to FIG. 5.

Figure 2:
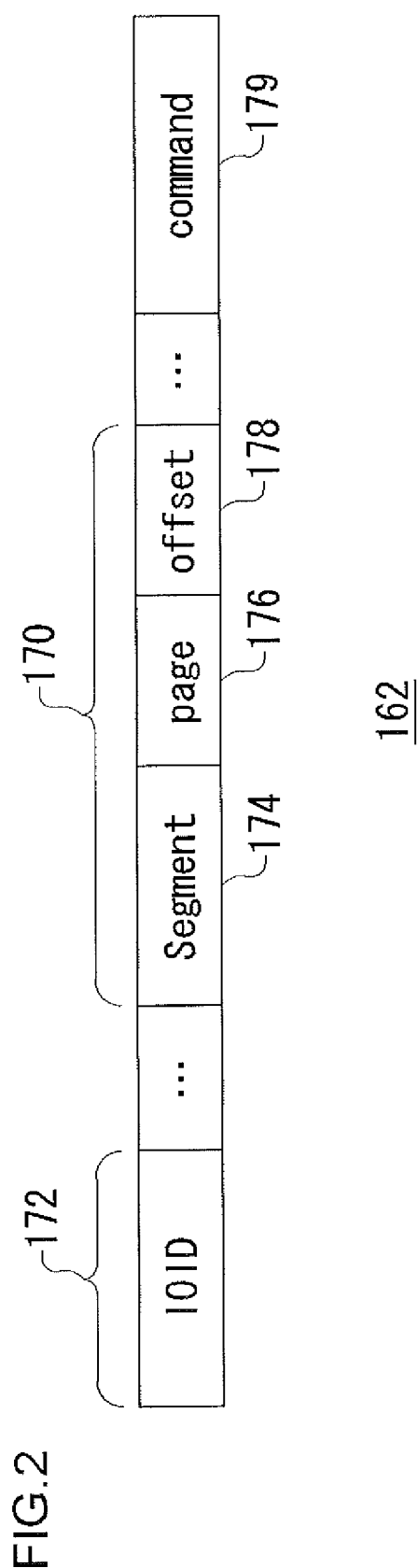
FIG. 2 illustrates a data structure of a access requesting command.

FIG. 2 illustrates a data structure of the access requesting command 162. The access requesting command 162 as shown in FIG. 2 is sent out to the I/O access control apparatus 300 from the command transmit auxiliary apparatus 200. An IOID region 172 represents an IOID that the command transmit auxiliary apparatus 200 assigns to uniquely identify a DMA requestor. The IOID is an ID by which to uniquely identify each DMA requestor in the information processing apparatus 100. A command region 179 indicates command contents such as read or write. An address region 170 indicates an address of an access destination. This address is a logical address but not the address that directly specifies a physical address. A logical address space is partitioned into segments and a segment is partitioned into pages. The specific address in each page is designated by an offset. The address region 170 contains a segment region 174, a page region 176 and an offset region 178. The segment region 174 indicates a segment value that designates a segment, the page region 176 indicates a page value that designates a page, and the offset region 178 indicates an offset region 178 that designates an offset value within the page.

Of the access requesting commands 162, the address region will be discussed later in conjunction with FIG. 6 and FIG. 7.

Figure 3:
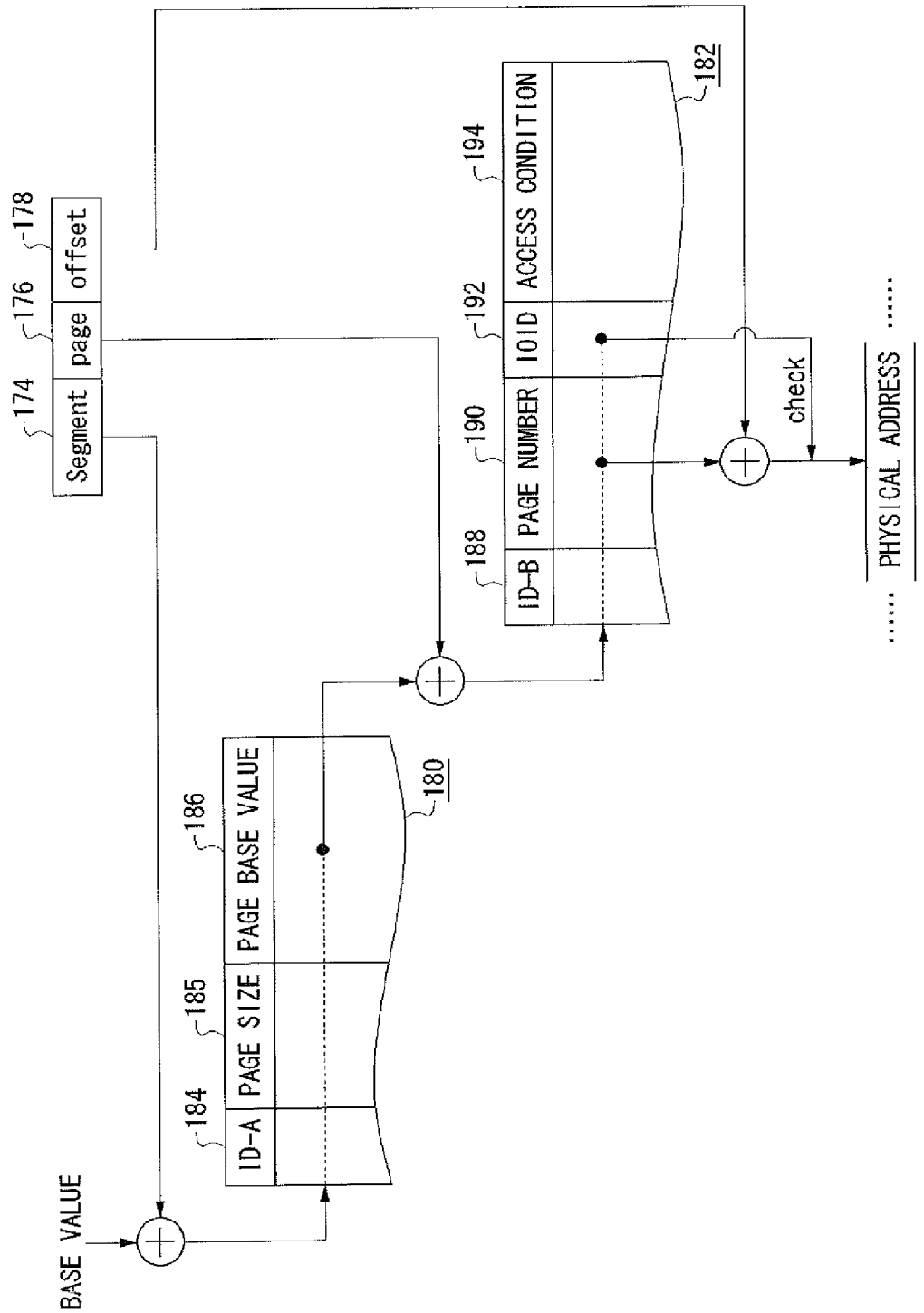
FIG. 3 is a schematic diagram to explain a process in which a logical address indicated by an access requesting command is translated into a physical address.

FIG. 3 is a schematic diagram to explain a process in which a logical address indicated by an access requesting command is translated into a physical address.

Such a conversion processing is carried out by the I/O access control apparatus 300. The I/O access control apparatus 300 extracts the address region 170 of an access requesting command 162. Firstly, the segment value is extracted. A predetermined base value is added to the segment value. The base value may be allocated by an OS or may be a fixed value. The base value added with the segment value is a first index value. A first translation table 180 is a data table in which the first index value is associated with a page base value. The page base value is specified by the first translation table 180.

In the first translation table 180, a first index column 184 indicates first index values. A page base column 185 indicates page sizes. A page base value column 186 indicates page base values. A page value in the page region 176 is added with a page base value specified by the first translation table 180. This value added together becomes a second index value.

A second translation table 182 is a data table in which the second index value is associated with the page number and the like. In the second translation table 182, a second index column 188 indicates second index values. A page number column 190 indicates page numbers. An IOID column 192 indicates the IOID of a DMA requestor where the access thereby is to be permitted for each page. An access condition column 194 indicates access attribute information in the page in question. A detail description of the access attribute information will be given later. Note that the first translation table 180 and the second translation table 182 are set by privileged software of an OS.

The page number at the access destination is identified by the second index value. If the IOID extracted from the access requesting command 162 agrees with the IOID value of the IOID column 192 for the thus identified page, access to said page is granted. When access is granted, an offset value is added to the address of the identified page and then a specific physical address is finally identified. Then the access is executed in accordance with the access attribute information indicated in the access condition column 194.

The access attribute information is information with which to condition an access method for the management space, and there are numerous examples as follows.

1. Whether or not the Access Sequence is to be Forced

Normally, the access to the recording medium is not necessarily executed in the access sequence and, instead, the access is executed in the order in which the memory controller can conveniently execute. The processing method like the above is generally referred to as an out-of-order execution or a weakly-ordered execution. In the access condition column 194, information by which to specify whether or not access is to be made according to the access requesting sequence instead of by out-of-order execution is contained as the access attribute information. In a case where a page is used where the access sequence is set forcibly, the access to that page is processed using a strict rule such that the access is executed in the order in which all the access requests are made. The processing method such as the above, in which the access sequence is forcibly set, is referred to as an in-order execution or a strictly-ordered execution. The method for controlling the access sequence can be set for each IOID. Suppose, for instance, that one DMA requestor of IOID=0022 accesses a physical address through a page A, and another DMA requestor of IOID=0023 accesses the same physical address through a page B that is different from the page A. Now, if in the second translation table 182 the access from the page A is set as an in-order execution, and the access from the page B is set as an out-of-order execution, the control of different access sequences can be done in accordance with the respective DMA requestors even though the DMA requestors access the same physical address.

2. Whether Maintaining Cache-Coherency is Necessary or not

Data of a main storage such as a main memory 140 is accessed via a cache memory. The cache memory is built into the PU 112 or an SPU 116. The PU 112 or an SPU 116 may also execute a process using a cache memory capable of achieving a faster access than the main memory 140. The data written to the cache memory is reflected on the main memory. However, depending on the time of such reflection, there are periods during which the data does not coincide between the cache memory and the main memory.

Information indicating whether the coherence (so-called cache coherence) between the data of cache memory and the data of the main memory 140 or local memory 144, at the time when there is an access request from the external source, is to be maintained or not is contained as the access attribute information.

In the case of a page where the cache coherence maintenance is set, which cache memory has the most updated data is detected by cache snooping and a cache memory's own state is changed so that the most updated data can be acquired whenever required. Cache coherence may also be maintained using other known methods such as by a directory-based protocol or by a shared cache.

3. Whether Writing to a Page is Permitted or not

Information indicating whether read only is permitted or read/write is permitted to this page is contained as the access attribute information.

Figure 4:
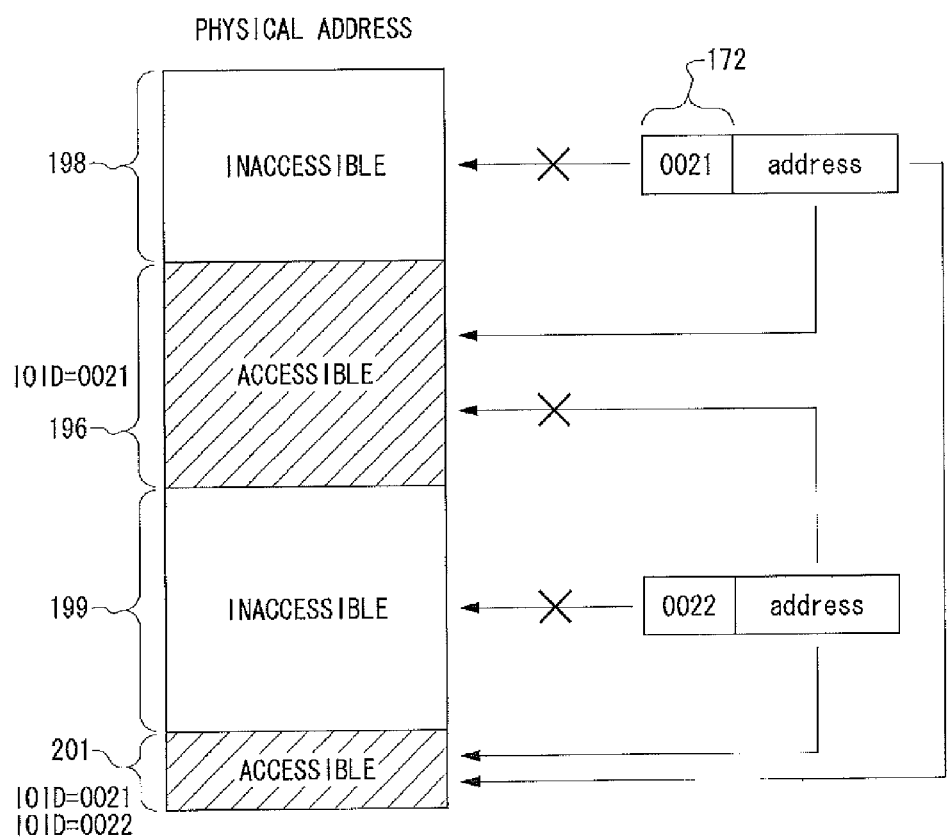
FIG. 4 is a schematic diagram to explain a relationship between a management space and access permission/denial.

FIG. 4 is a schematic diagram to explain a relationship between the management space and the access permission/denial.

The description is based on the assumption that as for DMA requestors, the IOID of the image processing DMAC 122 is "0021" and the IOID of the display controller 126 is "0022". In the management space, an inaccessible region 198 and an inaccessible region 199 are regions that the image processing DMAC 122 and the display controller 126 cannot access. These regions are mapped to the local memory 144 or mapped to the main memory 140. The image processing DMAC 122 of IOID "0021" can access an accessible region 196 and an accessible region 201. That is, in the second translation table 182, IOID "0021" is designated to the page mapped into to the accessible region 196 and the accessible region 201, in the IOID column 192.

The access to a region to which the access of the image processing DMAC 122 is prohibited can be prevented by referring to whether or not the IOID "0021" is designated to the page identified by the second translation table 182. By employing a method in which the IOID for uniquely identifying each DMA requestor in the information processing apparatus 100 is checked, the main memory 140 or local memories 144 mapped to the management space are protected against any unauthorized access.

The accessible region 201 undergoes the double mappings from separate pages about the access requesting entities of IOID "0021" and IOID "0022", respectively. One page A is accessed from an image processing side DMAC 122 of IOID "0021" whereas the other page B is accessed from the display controller 126 of IOID "0022". In the second translation table 182, the IOID "0021" is set to the page A whereas the IOID "0022" is set to the page B. Hence, the image processing DMAC 122 of IOID "0021" and the display controller 126 of IOID "0022" are permitted to access the accessible region 201. However, the page through which the image processing DMAC 122 accesses the accessible region 201 differs from the page through which the display controller 126 accesses the same accessible region 201. Accordingly, in the second translation table 182, whether access is permitted or not is set for the management space for each IOID in units of page. That is, the access condition suitable for the DMA requestor can be set for the management space in units of page, so that the storage area is more likely to be protected against the unauthorized access.

Assume that the segment value=100, the page value=10 and the offset value=0 in the image processing DMAC 122 of IOID "0021". Assume that the segment value=200, the page value=10 and the offset value=200 in the display controller 126 of IOID "0022". Assume also that both the respective pages designated indicates the same physical address of "23450000", having the page size of 4 KB, in the accessible region 201. Assume also that the image processing DMAC 122 of IOID "0021" is to access the physical address=23450000 whereas the display controller 126 of IOID "0022" is to access the physical address=23450200 (=23450000+200). Then two different access requesting entities will both be granted to access the accessible region 201.

As a modification, two or more IOIDs may be set to a single page. For example, assume that both the IOID "0021" and the IOID "0022" are set to the IOID column 192 for the page A mapped to the accessible region 201. Then both the image processing side DMAC 122 of IOID "0021" and the display controller 126 of IOID "0022" can access the accessible region 201 via the page A.

Even if the address designated by the access requesting command 162 is one such that a physical address is directly designated, the check by the IOID will function effectively. In the present embodiment, an independent address space can be used in accordance with a rule such that the address designated by the access requesting command 162 serves as a logical address where a physical address is not directly designated. Thus, robustness against the unauthorized access can be further enhanced.

Even if it is the page contained in the accessible region 196, it goes without saying that the write process is prohibited for an write-protected address region as access attribute information even if an access requesting entity has a valid IOID.

Figure 5:
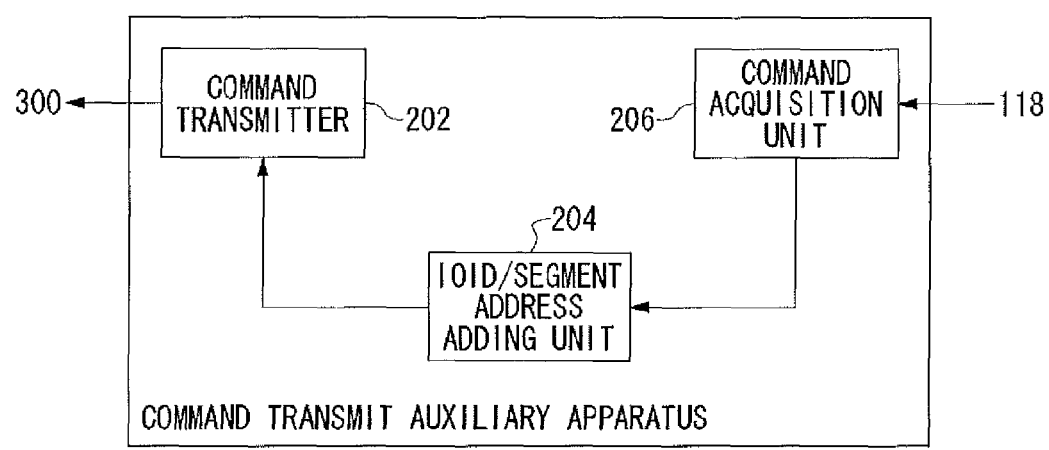
FIG. 5 is a function block diagram of a command transmit auxiliary apparatus.

FIG. 5 is a function block diagram of a command transmit auxiliary apparatus 200. The command transmit auxiliary apparatus 200 includes a command transmitter 202, an IOID/segment address adding unit 204 and a command acquisition unit 206.

The command acquisition unit 206 acquires commands from the access requesting entities. The DMA requestor sends an address indicative of an access destination in a management space (hereinafter referred to as "original address"), a command indicative of read or write and a DMA requestor ID (hereinafter referred to as "DMARID") described later to the command acquisition unit 206. DMARID is an ID to identify a DMA requestor and the detail thereof will be discussed later. The command acquisition unit 206 acquires commands, original addresses and DMARIDs.

The IOID/segment address adding unit 204 receives commands, original addresses and DMARIDs from the command acquisition unit 206, and then generates access requesting commands 162. Here, the IOID/segment address adding unit 204 adds an IOID to identify a DMA requestor, to the access requesting commands 162. It also adds segment addresses described later. In this rule, the command transmitter 202 transmits to the I/O access control apparatus 300 the access requesting commands 162 that contain at least the IOIDs, the logical addresses of the access destinations and commands. The command transmitter 202 transmits the access requesting commands to the I/O access control apparatus 300.

Figure 6:
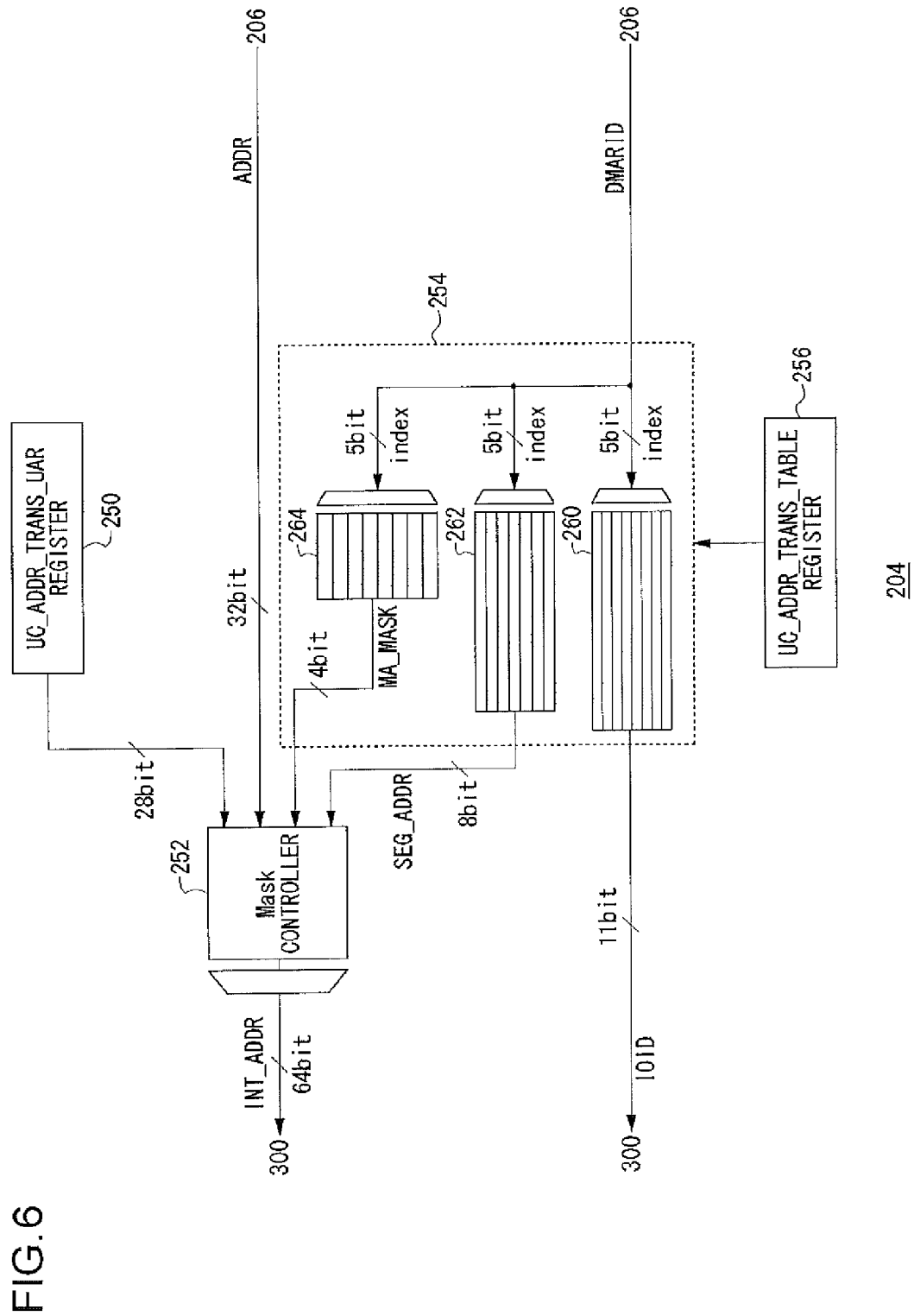
FIG. 6 is a schematic diagram showing processing contents of an IOID/segment address adding unit.

FIG. 6 is a schematic diagram showing the processing of the contents of the IOID/segment address adding unit 204. The IOID/segment address adding unit 204 includes a UC_ADDR_TRANS_UAR register 250, a mask controller 252, a translation unit 254, and UC_ADDR_TRANS_TABLE register 256.

The original address designated by the DMA requestor is inputted to the mask controller 252 via the command acquisition unit 206. Each DMA requestor is given an ID, so-called DMARID, different from IOID. DMARID serves the purpose as long as it is an ID with which the command transmit auxiliary apparatus 200 can uniquely identify the DMA requestor. However, the DMARID of each DMA requestor may differ depending on a system configuration or manufacturing period of a product. For example, the DMARID of a display controller 126 in the system configuration A may be "10225" whereas the DMARID of a display controller 126 in the system configuration B may be "00452". Even for the display controllers 126 of the same system configuration A, the DMARID thereof may differ depending on the manufacturing period. In the light of this, the IOID is an ID with which to identify the display controller 126 from the other access requesting entities irrespective of the type or manufacturing period of the display controller 126. The DMARID is converted to an IOID by the IOID translation table 260. The display controller 126 of the system configuration A and the display controller of the system configuration B may both be converted to the IOID of "0022" by the IOID translation table 260. That is, in the information processing apparatus 100 the IOID is an ID by which to identify the type of a DMA requestor. That the DMA requestor of the IOID "0022" corresponds to the display controller 126 can be set by an OS.

As described above, the I/O access control apparatus 300 in the overall control unit 110 determines whether the access is granted to the management space by the IOID or not. The I/O access control apparatus 300 may determine whether the access is granted or not, based on the DMARID instead of the IOID. When the access control is done based on the DMARID, the I/O access control apparatus 300 needs to know which kind of DMA requestor is being introduced and which DMARID is being registered. In this regard, since the I/O access control apparatus 300 according to the present embodiment operates based on the IOID associated beforehand with the type of the DMA requestor, it does not need to be concerned about what particular product the DMA requestor identified by said IOID is. That is, the IOID is a globally identified ID, so to speak, in the information processing apparatus 100. The IOID translation table 260 is a table for which various DMARIDs are converted into IOIDs. By the IOID translation table 260, the abstraction of a system configuration viewed from the overall control unit 110 which constitutes a receiving side of the access requesting command 162 can be realized. The conversion rule of the IOID translation table 260 can be set by privileged software of an OS via the UC_ADDR_TRANS_TABLE register 256. Thus, the only change in setting the IOID translation table 260 by the UC_ADDR_TRANS_TABLE register 256 can cope with the change of the system configuration.

Similarly, in a segment selection table 262, 8-bit segment address (SEG_ADDR) is selected based on the DMARID. In a mask translation table 264, a mask bit of 4 bits (MA_

MASK) is selected based on a 5-bit a DMARID. The privileged software can set the values of the segment selection table 262 or mask selection table 264 via the UC_ADDR_TRANS_TABLE register 256. The IOID converted by the IOID translation table 260 becomes part of the access requesting command 162, as described above. The 8-bit SEG_ADDR, 4-bit MA_MASK, 32-bit original address (ADDR) of an access destination to which the DMA requestor has originally designated and 28-bit preset value of UC_ADDR_TRANS_UAR register 250 are inputted to the mask controller 252. The mask controller 252 produces a 64-bit intermediate address (INT_ADDR) by the use of a processing method illustrated in FIG. 7. The IOID/segment address adding unit 204 adds the 11-bit IOID and commands so as to produce the access requesting command 162.

Figure 7:
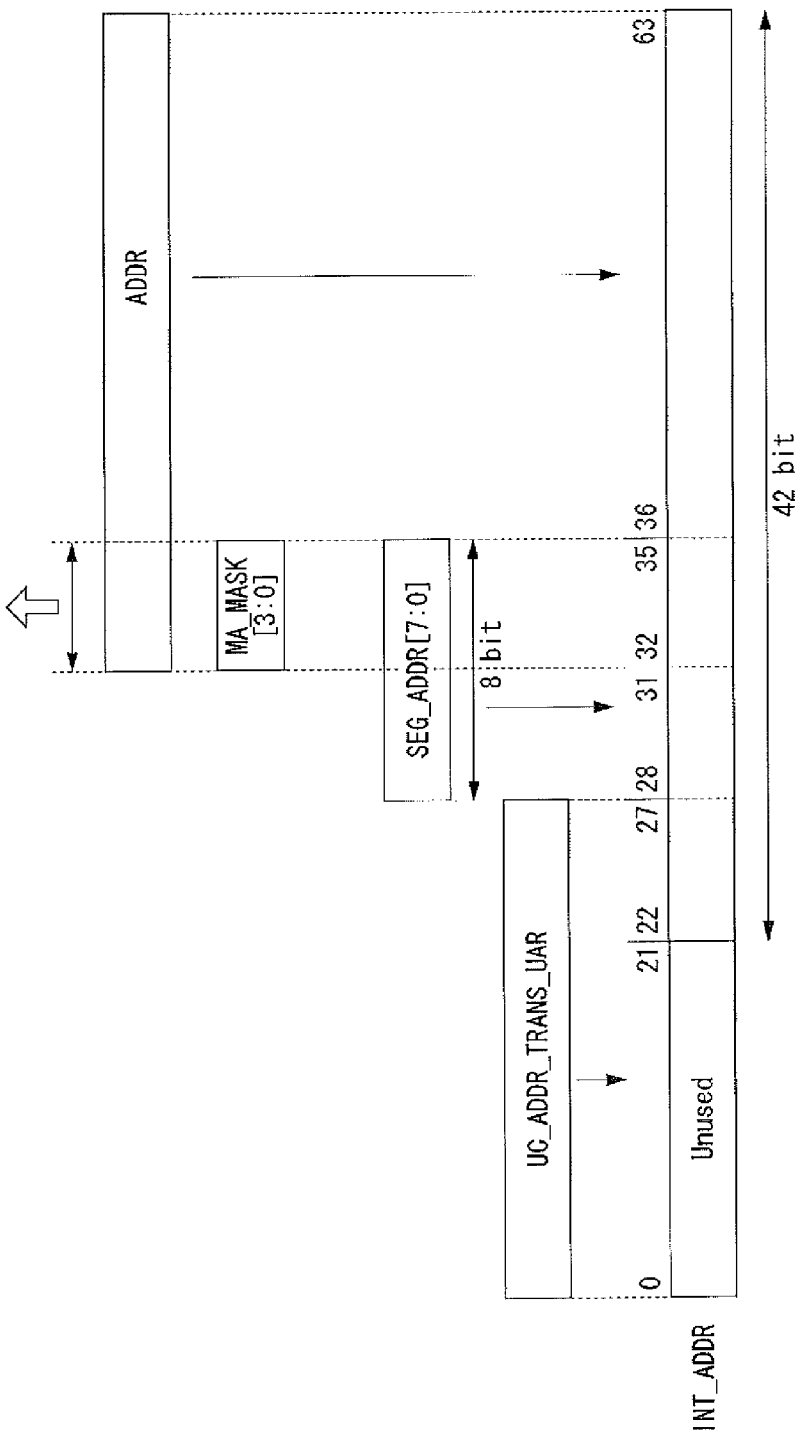
FIG. 7 is a schematic diagram showing a method for producing an intermediate address.

FIG. 7 is a schematic diagram showing a method for producing an intermediate address (INT_ADDR). The intermediate address (INT_ADDR) is of 64 bits where the 0th to the 27th bit are preset values outputted from the UC_ADDR_TRANS_UAR register 250. The privileged software can also set the UC_ADDR_TRANS_UAR register 250. Four bits of the 28th to the 31st bit are higher-order 4 bits of SEG_ADDR. Twenty eight bits of the 36th bit to 63rd bit are lower-order 28 bits. The 32nd to 35th bit are the result of the logical sum (OR) of the 4-bit value of logical product (AND) of the upper-order 4 bits of ADDR and MA_MASK, and the low-order 4 bits of SEG_ADDR. In this rule, the intermediate address of 64 bits in total is produced. In the present embodiment, the 0th bit to 27th bit of the intermediate address (INT_ADDR) are reserved regions whereas the 28th bit to the 63rd bit are the address regions.

Figure 8:
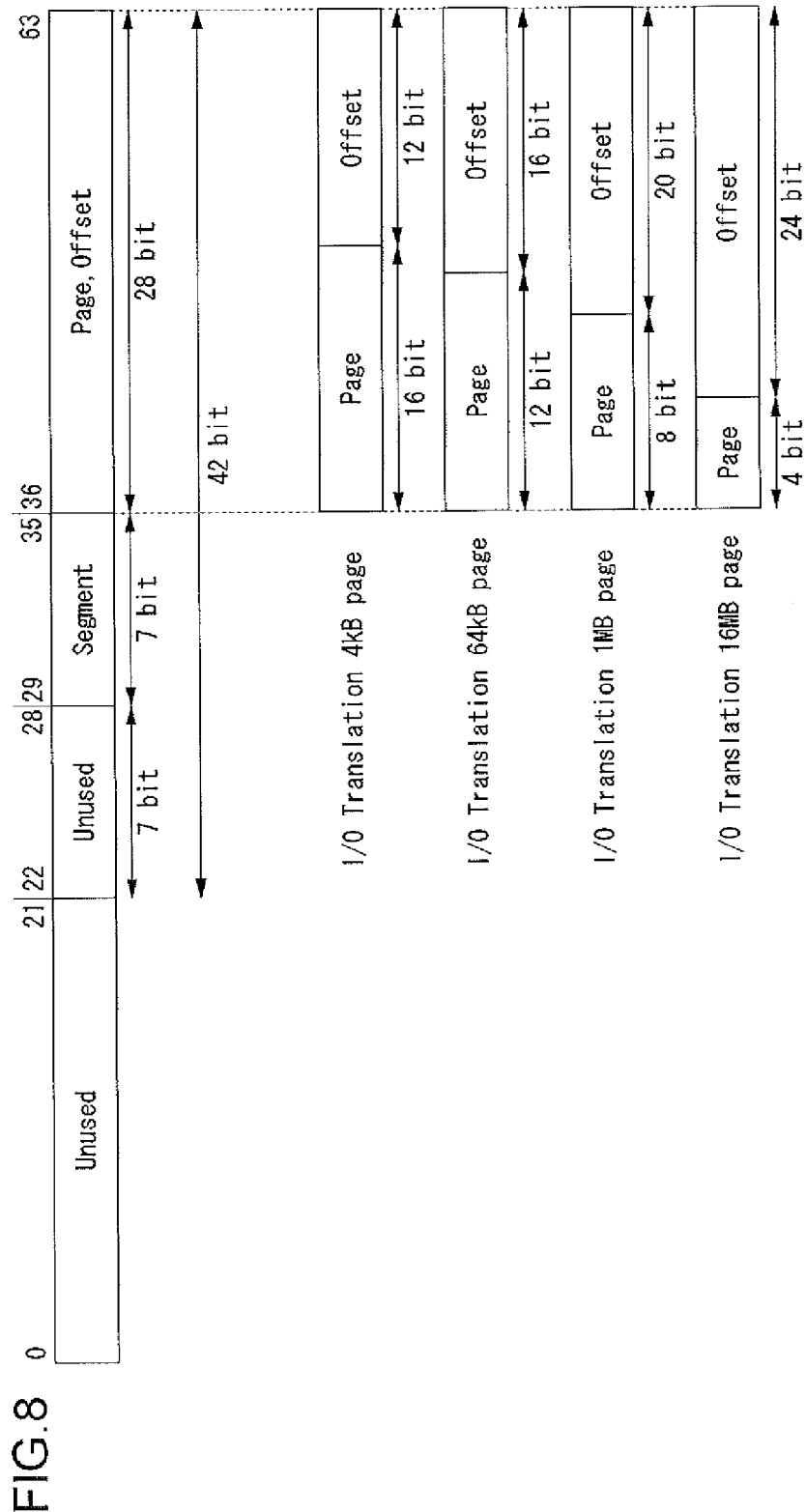
FIG. 8 illustrates relationships among a segment, a page and an offset of an address region in an intermediate address.

FIG. 8 illustrates relationships among a segment, a page, and an offset of the address region 170 in an intermediate address (INT_ADDR).

When the page size is 4 KB, the page address width is 16 bits and the number of pages is 65,536. When the page size is 64 KB, the page address width is 12 bits and the number of pages is 4,096. When the page size is 1 MB, the page address width is 8 bits and the number of pages is 256. When the page size is 16 MB, the page address width is 4 bits and the number of pages is 16. The size of page in use is determined by the page size column 185 of the first translation table 180. In this rule, a plurality of page sizes can be supported in the access requesting command 162.

Figure 9:
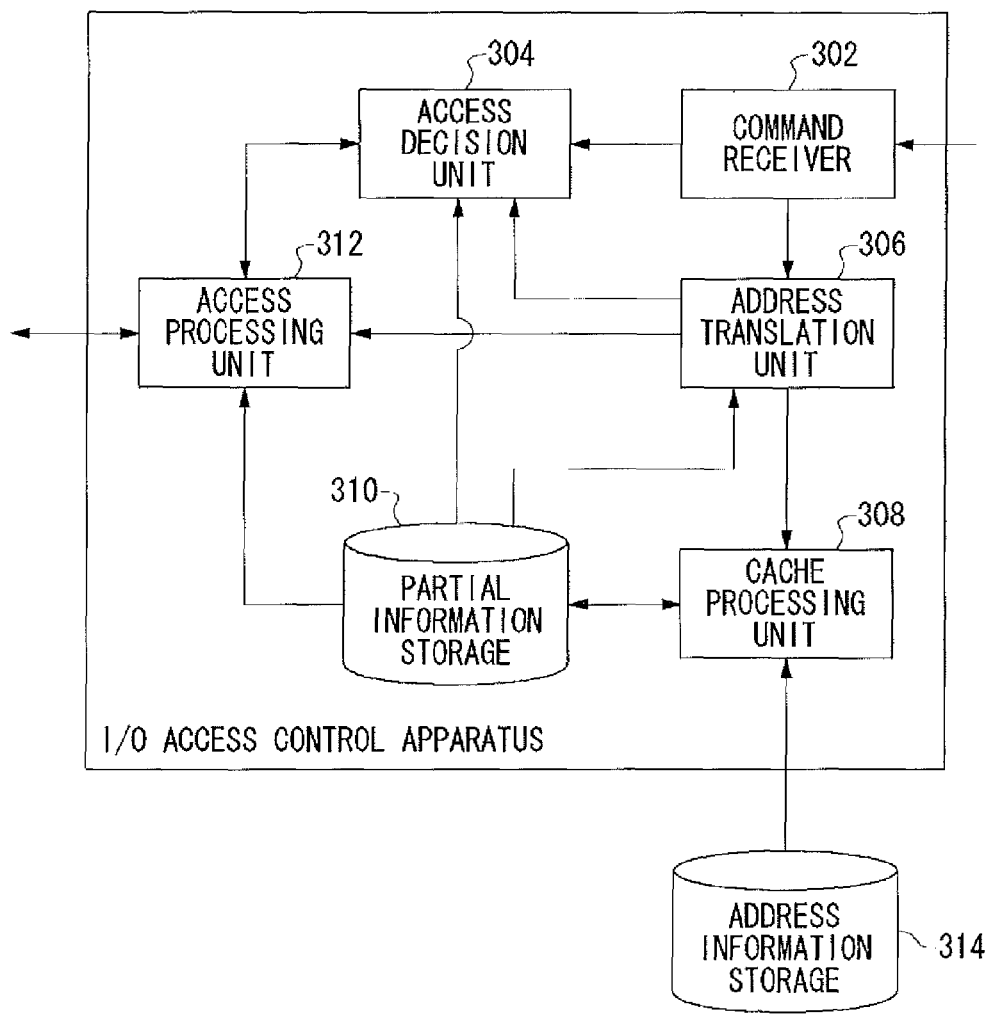
FIG. 9 is a function block of the I/O access control apparatus.

FIG. 9 is a function block of the I/O access control apparatus 300. The I/O access control apparatus 300 includes a command receiver 302, an access decision unit 304, an address translation unit 306, a cache processing unit 308, a partial information storage 310, and an access processing unit 312.

The command receiver 302 receives an access requesting command 162 transmitted from the command transmit auxiliary apparatus 200. The cache processing unit 308 loads part of data of the first translation table 180 or second translation table 182 shown in FIG. 3 into the partial information storage 310.

The address information storage 314 may be constituted as part of the main memory 140. The partial information storage 310 may be constituted by a built-in cache capable of accessing faster than the address information storage 314. In what is to follow, the first translation table 180 and/or the second translation table 182 stored in the address information storage 314 will be collectively referred to as an "address translation table". Part of the address translation table loaded into the partial information storage 310 will be referred to as "partial translation table" in distinction from the address translation table.

The operation of data transfer by the cache processing unit 308 between the partial information storage 310 and the address information storage 314 is also called a "refill."

The address translation unit 306 translates a logical address into a physical address by referring to the partial translation table stored in the partial information storage 310. The conversion method was explained with reference to FIG. 3. When the data necessary for converting a logical address into a physical address is not contained in the partial translation table, which is stored in the partial information storage 310, the cache processing unit 308 newly refills the partial translation table containing said part from the address information storage 314 to the partial information storage 310. The physical address identified by the address translation is conveyed to the access processing unit 312 and the access decision unit 304.

The access decision unit 304 determines whether or not the IOID matches for the page identified in the address translation unit 306. In other words, the access decision unit 304 determines if it is an accessible region or not. The decision result is conveyed to the access processing unit 312. On the condition that the access has been granted by the access decision unit 304, the access processing unit 312 executes access to the management space, by a command designated for a physical address conveyed from the address translation unit 306. In so doing, the access decision unit 304 executes access according to the access attribute information designated for the page. The access destinations of the access processing unit 312 are storage media, such as the main memory 140 or local memory 144, which have been mapped to the management space of the PU 112.

Out of the access requests by various DMA requestors, the access processing unit 312 stores effective access requests in a queue. The access processing unit 312 retrieves sequentially an access request from the queue and then executes access to the management space. It is possible that the access processing unit 312 executes access to the local memory 144 by the DMA requestor B while access to the main memory 140 by the DMA requestor A is being executed. In this rule, the access processing unit 312 can execute, in parallel, a plurality of types of accesses by a plurality of DMA requestors.

Note that the I/O access control apparatus 300 may be so configured as to contain a portion corresponding to the address information storage 314.

Figure 10:
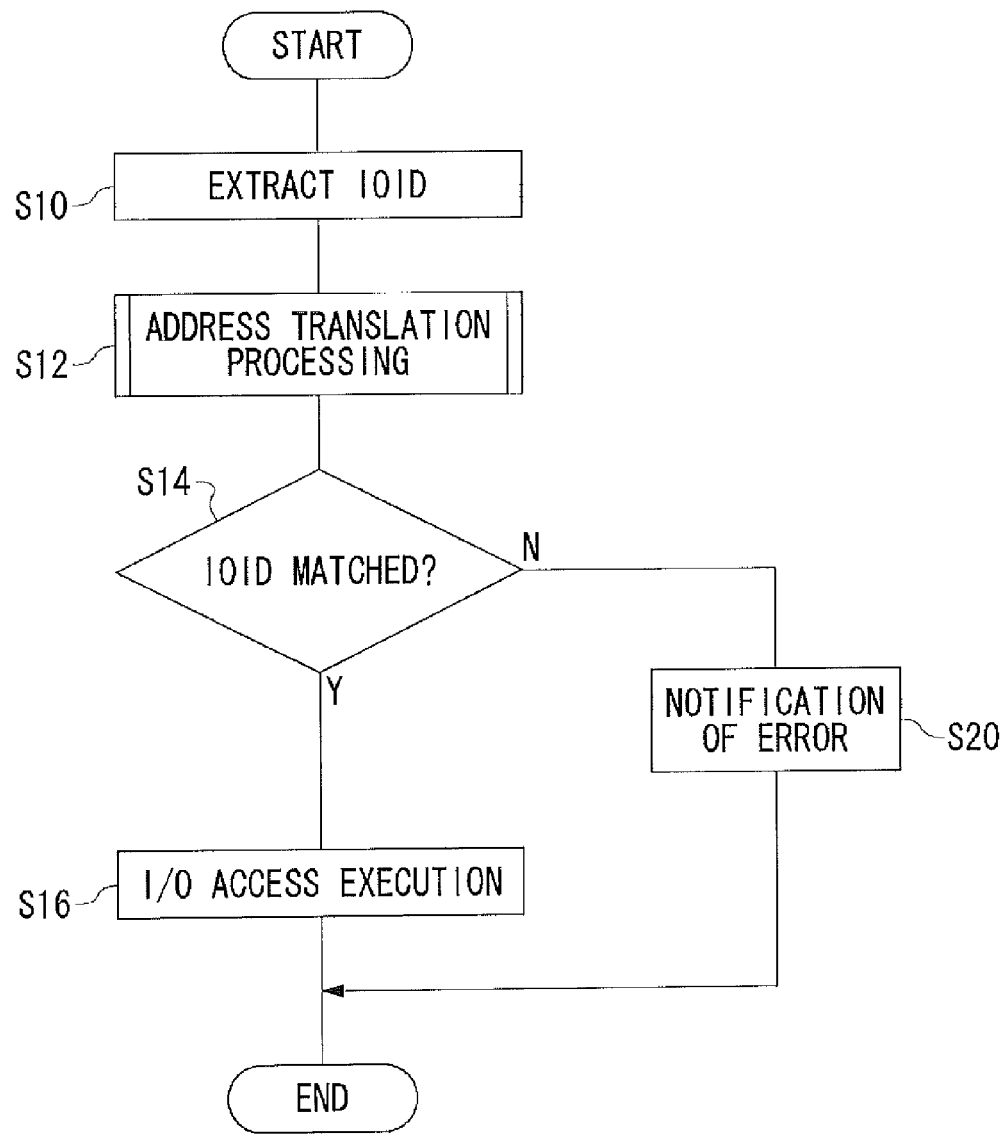
FIG. 10 is a flowchart showing an access control process by the I/O access control apparatus.

FIG. 10 is a flowchart showing an access control process by the I/O access control apparatus 300. The command receiver 302 extracts IOIDs from the received access requesting commands 162 (S10). The address translation unit 306 translates logical addresses into physical addresses (S12). The access decision unit 304 determines whether or not the IOID of an access requesting command 162 agrees with the IOID of a page identified by the second translation table 182 (S14). If agreed (Y of S14), the access processing unit 312 will execute the access to the management space according to the access attribute information (S16). If not (N of S14), the access processing unit 312 notifies to the command transmit auxiliary apparatus 200, which is a sender, about the error (S20). The notification of error may be conveyed to the OS as error message in the form of event notification. In this case, the access will be denied.

Figure 11:
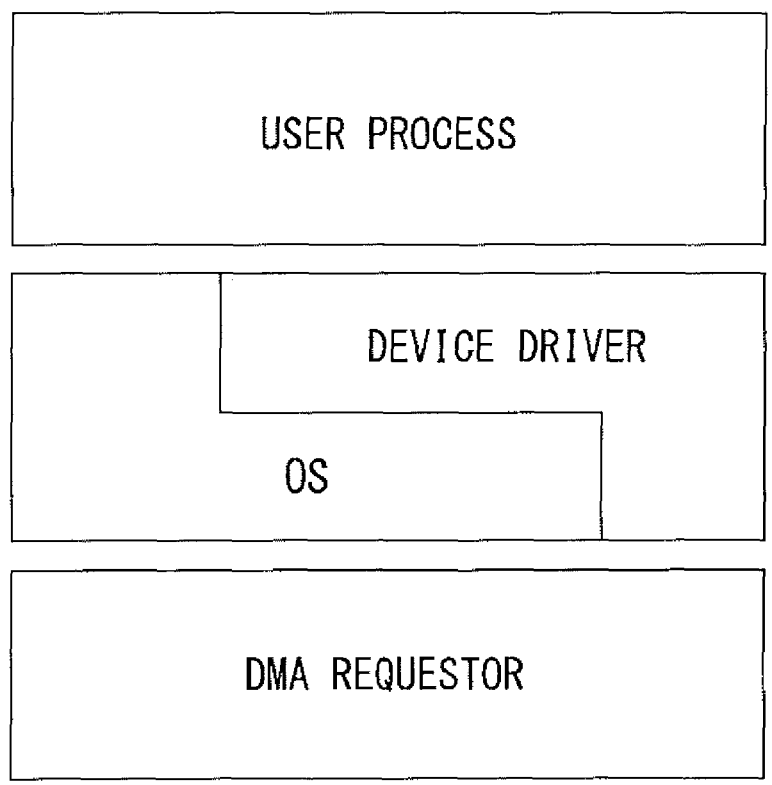
FIG. 11 is a schematic diagram to show a general relationship between a user process, a DMA requestor, and a device driver.

FIG. 11 is a schematic diagram to show a general relationship between a user process, a DMA requestor, and a device driver. A user process executed on the PU 112 and/or SPU 116 controls various DMA requestors during its execution process. The user process will transfer various data to the DMA requestor, while the DMA requestor will transfer various data to the user process. For such a data transfer, the main memory 140 is provided an area for temporarily storing the data to be transferred. The memory space corresponding to such an area is the "DMA address space". The DMA address space is a part of the management space.

According to a general configuration, the user process cannot directly access the DMA address space for the following reason. If various types of user processes, which are of greater variety than device drivers, were allowed to directly access the DMA address space, an illegal operation by one user process could make a serious impact on the overall operation stability of the information processing apparatus 100. For instance, consider that a user process A writes data D in a predetermined area in the DMA address space to send the data D to a DMA requestor a, and then gives an instruction to transfer the data. At that time, if the user process A wrote the data D in another area in the DMA address space, which corresponds to another DMA requestor b, the DMA requestor b would operate based on the illegal data. If the user process were well designed, such a problem would not happen; however it might not be realistic to verify the validity of all the operations by a large number of user processes.

For this reason, a user process, in general, indirectly accesses the DMA address space via a device driver. If the device driver operates integrally with an operating system, the user process accesses the DMA address space via the operating system. If one device driver operates illegally, the same problem will happen; however the device drivers can be manageable, since the device drivers installed in the information processing apparatus 100 are of far less variety than the user processes executed in the apparatus 100. Furthermore, as mentioned above, if the access to the DMA address space from the device driver is strictly controlled based on the IOID, the illegal access to the DMA address space can be still more easily prevented.

The general mechanism of the DMA transfer will be hereinafter explained in detail. A user process requests a device driver to perform a DMA transfer. At that time, the user process places data to be sent in the memory and notifies the device driver of its address. The device driver obtains the data to be sent from that address, sets registers for controlling the DMA requestor, and perform the DMA transfer. The resultant data indicating the transfer result will be temporarily stored in a predetermined area of the memory (hereinafter referred to as a "DMA transfer data area"). Then, the device driver copies the resultant data into a predetermined memory area that has been mapped to the user process. Since the device driver, which plays a main role in the DMA transfer, operates in a privileged level, the malfunction of the device driver might possibly have a harmful influence on the operating system and/or the data of the other user processes. In order to address this kind of problem, the above-mentioned IOID-based mechanism will be adopted to control the access to the memory from the device driver.

A general design concept such that a user process indirectly accesses the DMA address space via a device driver will be preferable from the viewpoint of the operation stability of the information processing apparatus 100; however it is not necessarily suitable from the viewpoint of the operation efficiency. When the user process controls the DMA requestor, the control is always temporarily moved to the device driver and/or the operating system, resulting in an overhead. In particular, the overhead becomes large when the device driver copies the resultant data from the DMA transfer data area to another memory area, or when context switching occurs. From the viewpoint of the operation efficiency, it would be preferable if the user process could transfer data to the DMA requestor without relying on the device driver and the like. To do this, a mechanism will be necessary to prevent an illegal access from happening, when the user process is allowed to directly access to the DMA address space. Such a mechanism will be explained with reference to FIG. 12 onward.

It is noted that in a so-called multi-core system having a single PU 112 and a plurality of SPUs 116, as in the information processing apparatus 100 of this embodiment, the PU 112 executes basic software such as an operating system or device drivers. In this configuration, an influence of the overhead caused by the presence of the device drivers might become easily evident. For instance, the SPU 116a executes a user process A, and the SPU 116b executes a user process B in parallel and simultaneously. The user process A attempts to perform DMA transfer of data Da to a DMA requestor a, while the user process B attempts to perform DMA transfer of data Db to another DMA requestor b. To do this, both the user process A and the user process B request the device drivers of the PU 112 to perform the process. As a result, the requests are serialized on the PU 112. Even when a plurality of SPUs 116 execute a plurality of user processes in parallel and simultaneously, the PU 112 could become a bottleneck when a plurality of user process require the device drivers with a great frequency. As a result, the advantages of the multi-core system will not be fully exercised. This problem will be later described in details with reference to FIG. 15. In the case of a multi-core system such as the information processing apparatus 100 in this embodiment, if the user process could access to the DMA address space without the device drivers, in other words, without relying on the PU 112, the overall processing efficiency will be easily improved.

Figure 12:
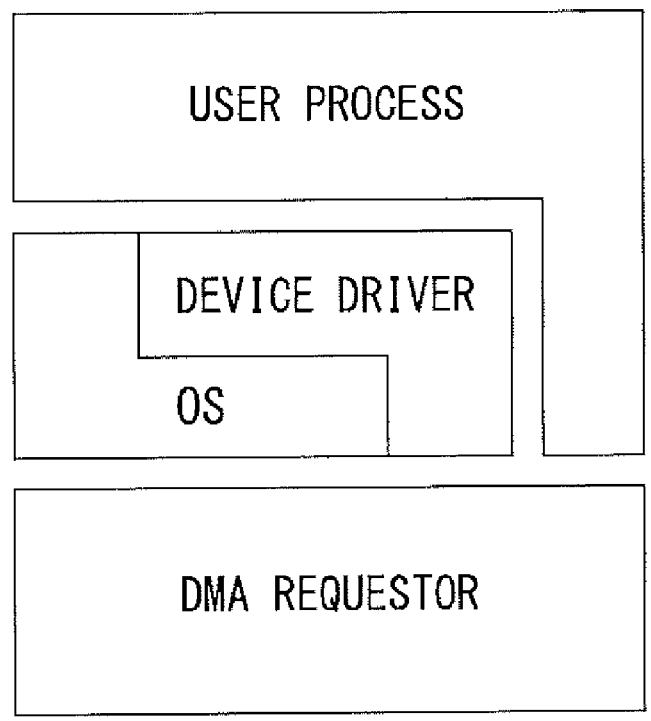
FIG. 12 is a schematic diagram to show a relationship between a user process, a DMA requestor, and a device driver according to an embodiment of the present invention.

FIG. 12 is a schematic diagram to show a relationship between a user process, a DMA requestor, and a device driver according to an embodiment of the present invention. In this embodiment, a user process can directly access to a logical address space exclusively used by a DMA requestor (hereinafter referred to as a "DMA requestor space"). An independent logical address space is assigned to each user process. A part of the logical address space is mapped to the DMA address space. The DMA address space is normally a physical address area formed in the main memory 140. The DMA address space is further mapped to the DMA requestor space. In other words, the DMA requestor space for the DMA requestor and the logical address space for the user process are doubly mapped to the DMA address space. By specifying a logical address, the user process thereby can directly access the DMA requestor space through the DMA address space without relying on the other software such as the device drivers or the operating system. The data can be directly transferred to the DMA requestor through the DMA address. Therefore, each user process on each SPU 116 can perform DMA transfer to a plurality of DMA requestors in parallel and simultaneously, regardless of the operation condition of the PU 112.

More specifically, the user process writes data D to be transferred in a predetermined area of the local memory 144. This area has been mapped to the DMA address space in the main memory 140. The DMAC embedded in the SPU 116 transfers the data D to the DMA address space. Then, the DMA requestor reads the data D from the DMA address space by using an access request command. At this time, since the I/O access control apparatus 300 checks the IOID, only a relevant DMA requestor is allowed to read the data.

The DMA requestor performs a predetermined process based on the received data D and then writes data R indicating the process result into the DMA address space in the main memory 140 by using an access request command. The write operation by the DMA requestor is checked against the IOID. The DMAC of the SPU 116 performs DMA transfer of the data R from the DMA address space in the main memory 140 to the local memory 144. Thus, the user process obtains the data R.

Figure 13:
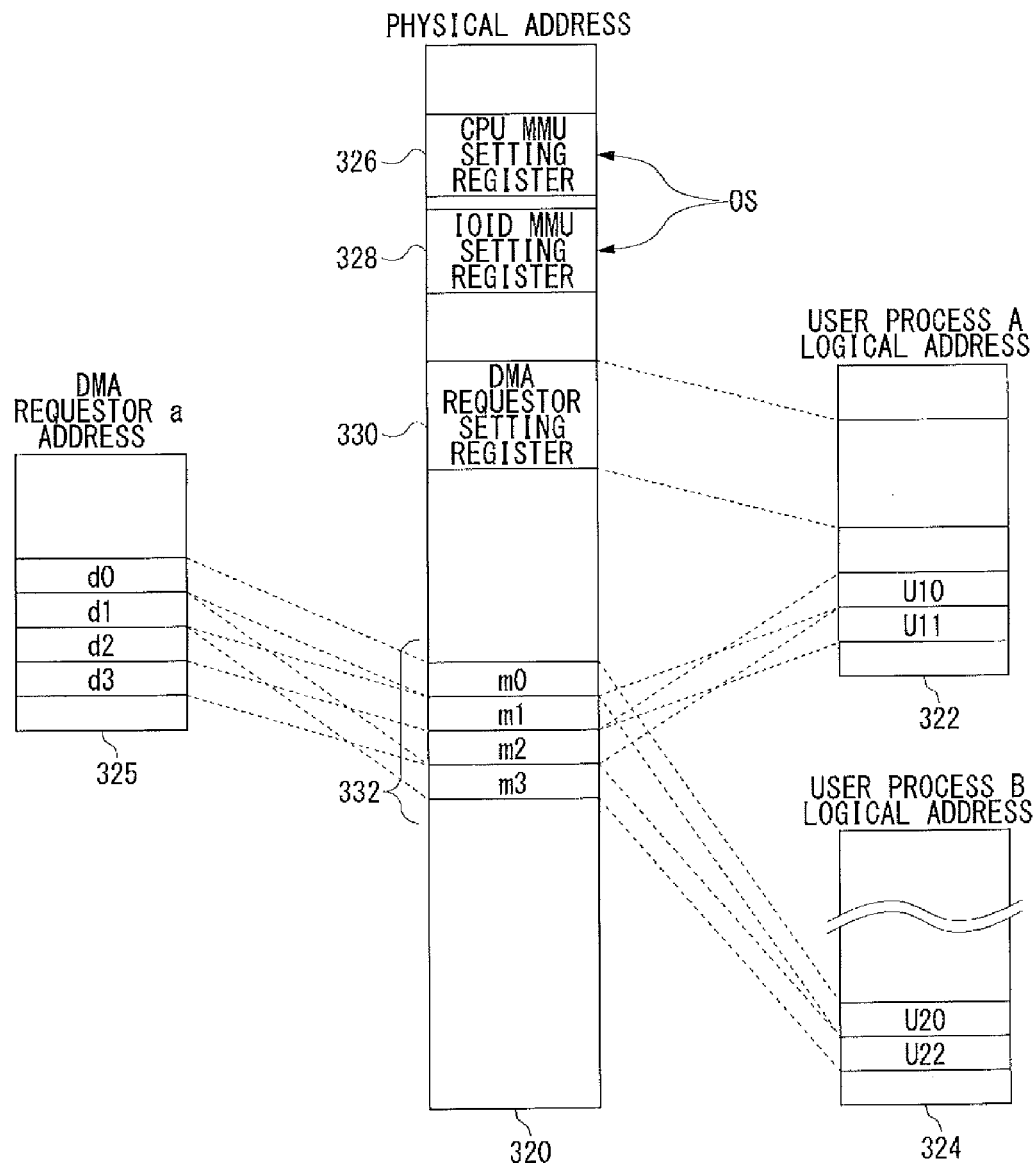
FIG. 13 is a schematic diagram to show a mapping between a logical address space of a user process and a DMA address space.

FIG. 13 is a schematic diagram to show a mapping between a logical address space of a user process and a DMA address space. The DMA requestor space 325 indicates an address space formed by the address (original address) of the area used for DMA transfer by a DMA requestor a. The physical address 320 shows the physical address of the management space. The management space is a physical address space formed as an assembly of various registers, the local memory 144 and the main memory 140. A part of the management space forms the DMA address space. The logical addresses 322, 324 indicate the logical addresses of the user processes A, B respectively.

The physical address range indicated as the CPU MMU setting registers 326 correspond to the registers for setting mapping between the logical address 322 and the physical address 320 and/or mapping between the logical address 324 and the physical address 320. The CPU MMU set registers 326 are embedded in each SPU 116 and/or the PU 112. The detail will be explained with reference to FIG. 14.

The physical address range indicated as the IOID MMU setting registers 328 correspond to the registers for setting the correspondence between the DMA requestor space 325 and the physical address 320, in other words, between the DMA requestor space 325 and the DMA address space. More specifically, they correspond to the UC_ADDR_TRANS_UAR register 250 and the UC_ADDR_TRANS_TABLE register 256 of FIG. 6. The IOID MMU setting registers 328 are embedded in the I/O access control apparatus 300.

The values of these registers are set by the operating system, more specifically, by a hypervisor. In addition, only software running in a privileged level such as the operating system can access the CPU MMU setting registers 326 and the IOID MMU setting registers 328.

The DMA requestor setting registers 330 are the registers in which the user process writes parameters for controlling the DMA requestor. The device driver controls each DMA requestor according to the parameters in the DMA requestor registers 330.

The data area 332 is an area for storing data to be exchanged with the DMA requestor. The DMA requestor setting registers 330 and the data area 332 form the DMA address.

In this figure, the data area 332 contains four areas m0 to m3. These areas are associated with four areas (d0 to d3) in the DMA requestor address 325 through the IOID MMU setting registers 328. The DMA requestor issues an access request command in which any one of d0 to d3 is set as an access destination by using the original address. At this time, the DMA requestor sends the DMARID and the original address to the command transmit auxiliary apparatus 200. The command transmit auxiliary apparatus 200 translates the DMARID into the IOID by using the IOID translation table 260. In addition, the apparatus 200 translates the original address into an intermediate address according to the settings of the IOID MMU setting registers 328. In the I/O access control apparatus 300, the intermediate address is translated into an access destination address in the DMA address space, namely, a physical address in the main memory 140. By translating the respective addresses of d0 to d3 into any one of the addresses of m0 to m3, a physical address in the management space is identified. The I/O access control apparatus 300 determines whether the access to the relevant m0 to m3 is permitted or not by checking the IOID. The access to any other areas than m0 to m3 is not permitted.

On the other hand, the areas u10 and u11 in the logical address space of the user process A are respectively mapped to m2 and m1 in the physical address 320 by the setting of the CPU MMU setting registers 326. Likewise, the areas u20, u22 in the logical address space of the user process B are respectively mapped to m0 and m3 in the physical address 320.

It is noted that the DMA address space to be accessed by the user processes A and B and the DMA address space to be accessed by the operating system are distinct areas. In other words, in the physical address 320, the area to be accessed by a user process and the area to be accessed by the operating system (hereinafter referred to as an "OS area") are separated. The operating system thereby can control the DMA requestor on its own regardless of the occurrence of any illegal operations by the user process against the DMA requestor. In addition, the DMA requestor is prohibited from accessing all or a part of the OS area. It is realized by, for instance, the above-mentioned IOID-based mechanism. This design can prevent any illegal operations by the DMA requestor from destroying the data in the OS area and destabilizing the behavior of the operating system.

The process according to the embodiment can be more specifically summarized as follows. The software in a privileged level such as the operating system maps the DMA requestor setting registers 330 to the logical addresses 322, 324, and so on. This enables the user process to access the DMA requestor setting registers 330 via the MMU mechanism. Then, the operating system as the software in a privileged level maps the DMA requestor space 325 to the data area 332 and further maps the logical addresses 322, 324 to the same data area 332. Thus, the data area 332 becomes an area mapped from both the logical address of the user process and the DMA requestor space 325 of the DMA requestor. The user process sets the DMA requestor setting registers 330 to perform DMA transfer. The resultant data will be placed in the data area 332. As described, once the mapping is completed, the user process can perform DMA transfer on its own without requiring the device drivers to mediate.

Even if the user process gives an erroneous instruction to the DMA requestor, the memory access by the DMA requestor is strictly controlled by using the IOID. Therefore, the robustness of the overall system can be ensured even when the DMA transfer driven by the user process is allowed. Furthermore, since the device driver does not involve in the DMA transfer, the overhead can be more significantly reduced than the general method explained with reference to FIG. 11. A configuration can be obtained that facilitates various third parties to create more efficient user processes and ensures the stability of the overall system more easily.

Figure 14:
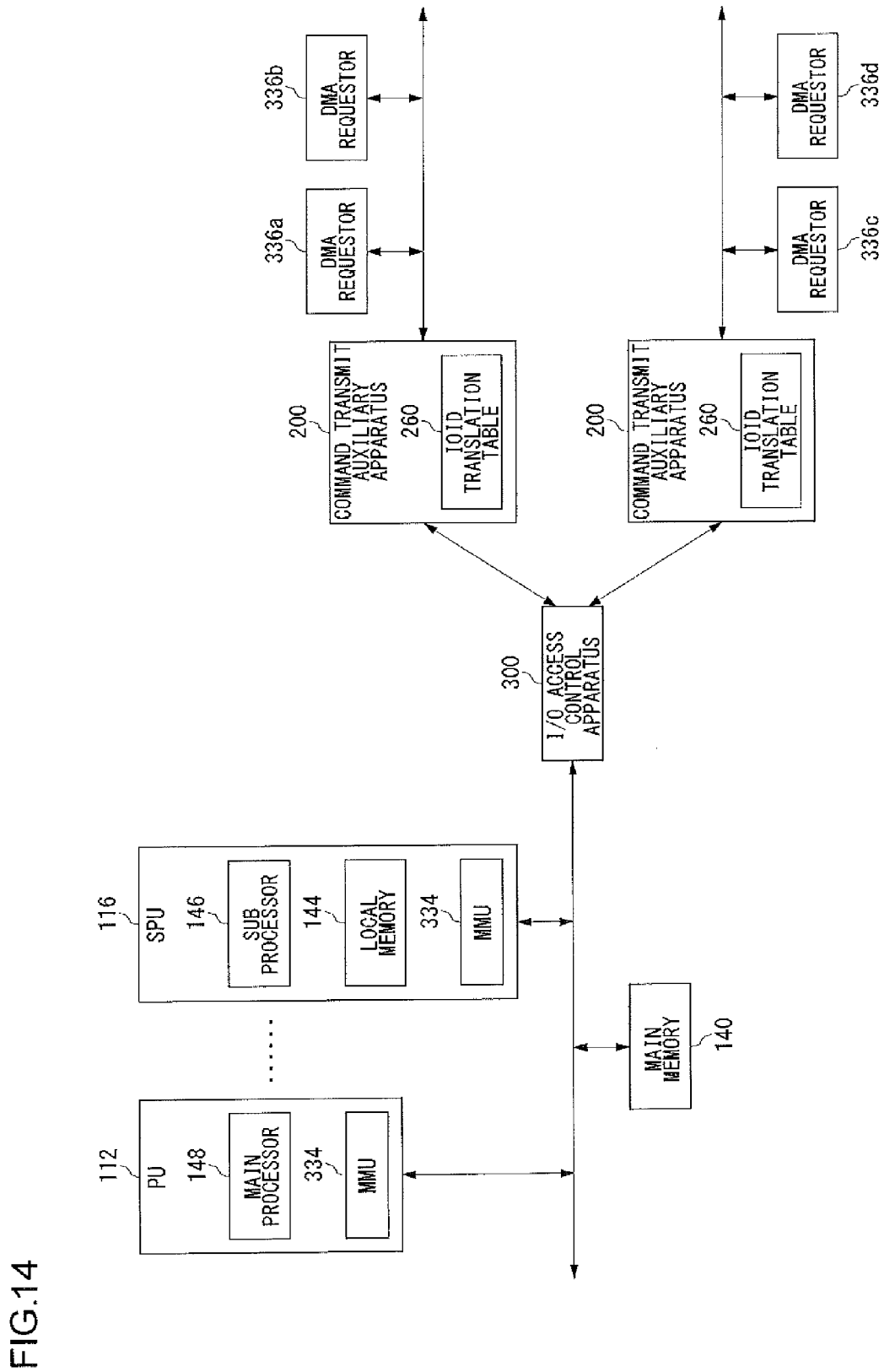
FIG. 14 is a schematic diagram to explain a DMA transfer in an information processing apparatus.

FIG. 14 is a schematic diagram to explain a DMA transfer in the information processing apparatus 100. The PU 112, the SPU 116, and the operating system, device drivers and user processes executed on these processing units serve as a "process control apparatus". Furthermore, the process control apparatus and the I/O access control apparatus 300 form a "memory access control system".

The DMA transfer can be categorized into two types: (1) DMA transfer between the DMA requestor 336 and the DMA address space; and (2) DMA transfer between the user process and the DMA address space.

(1) DMA Transfer Between the DMA Requestor 336 and the DMA Address Space

For instance, the DMA requestor 336a sends the DMARID and the original address to the command transmit auxiliary apparatus 200. The command transmit auxiliary apparatus 200 translates the DMARID into the IOID by using the IOID translation table 260. In addition, the apparatus 200 translates the original address into an intermediate address according to the settings in the IOID MMU setting registers 328. In the I/O access control apparatus 300, the intermediate address is translated into an access destination address in the DMA address space, namely, a physical address in the main memory 140. The DMA requestor 336a performs a DMA transfer of the data stored in the graphics memory 128 or the like addressed to the relevant physical address in the main memory 140. Thus, the DMA requestor 336a transmits the data to the data area 332 in the main memory 140.

(2) DMA Transfer Between the User Process and the DMA Address Space

The user process running on the SPU 116 notifies the MMU 334 embedded in the SPU 116 of the logical address indicating the destination of the DMA transfer. The MMU 334 contains the CPU MMU setting registers 326 therein. In the CPU MMU setting registers 326, a mapping table has been registered that defines a correspondence relationship between the logical address and the physical address in the DMA address space. The MMU 334 serves as an "address translation unit" of the "process control apparatus". The operating system that registers the mapping table serves as a "mapping unit" of the "process control apparatus".

Once the logical address has been notified, the MMU 334 refers to the mapping table set by the operating system and translates the logical address into the physical address in the DMA address space. Then, the DMA (not shown) of the SPU 116 perform a DMA transfer addressed to the physical address. The user process thus performs the DMA transfer to the DMA address space formed in the main memory 140 without relying on the device driver.

For instance, when the user process A shown in FIG. 13 notifies the MMU 334 of the logical address of the area u10 and sends out the data D to be transferred, the data D is transferred to m2 of the DMA address space via the address translation function of the MMU 334, wherein m2 is an area of the main memory 140. The area m2 is associated with d3 of the DMA requestor a. Therefore when the DMA requestor a detects writing of the data D for d3, the requestor issues an access request command to read the data D specifying the address d3. The DMA requestor a thus obtains the data D.

When the DMA requestor a sets the destination of the data R indicating the process result and issues an access request command specifying a write operation, the command transmit auxiliary apparatus 200 checks the IOID and then transmits the data R to m1 in the DMA address space. The area m1 is associated with the area u11 in the logical address space of the user process A. Therefore when the DMAC embedded in the SPU 116 detects writing for the area m1, the DMAC notifies an event to the user process A. The user process A obtains the data R from m2.

Figure 15:
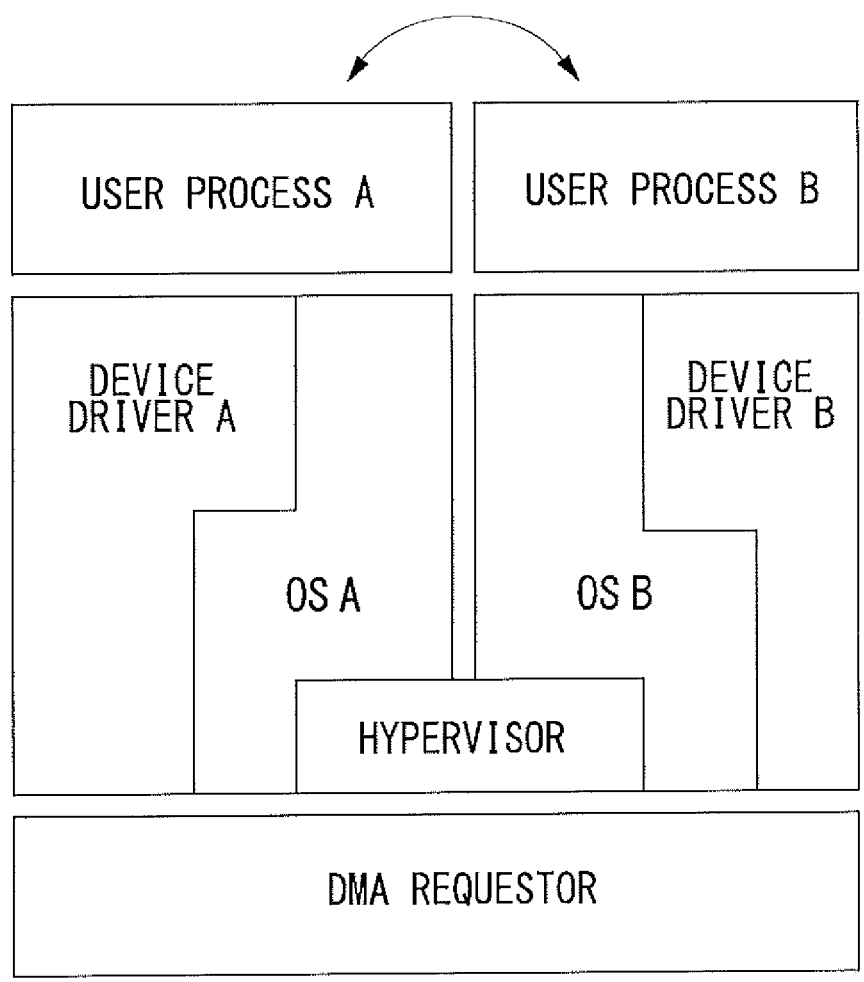
FIG. 15 is a schematic diagram to show a general relationship between a user process, a DMA requestor, and a device driver in a multi-operating system environment.

FIG. 15 is a schematic diagram to show a general relationship between a user process, a DMA requestor, and a device driver in a multi-operating system environment. In this figure, two operating systems called OS A and OS B run on a hypervisor. The hypervisor is privileged software and it is executed on the PU 112. The hypervisor periodically switches context between the OS A and the OS B. A device driver A and a user process A will be executed when the OS A is running, while another device driver B and another user process B will be executed when the OS B is running. Under a general design in which the user process is allowed to perform a DMA transfer only via the device driver, if the context switch occurs from the OS A to the OS B, the user process A is unable to perform any DMA transfer, since the device driver A becomes unavailable.

In order to make the context switch from the OS A to the OS B happen during user process A performing DMA transfer by using the device driver A, the hypervisor must wait until the DMA transfer is completed.

To perform a DMA transfer, the user process first requests a device driver running on the operating system that the user process relies on. For instance, the user process A first requests the device driver A to perform the process. The hypervisor herein includes the implementation of a "pseudo device driver". The pseudo device driver arbitrates a plurality of access requests for a single DMA requestor. For instance, when the user process A on the OS A and the user process B on the OS B attempt to use the DMA requestor a at the same time, the access requests from the respective user processes are serialized. The serialization prevents a plurality of user processes from accessing to a single DMA requestor.

As described above, under a general model where the user process accesses the DMA requestor via the device driver in the multi-operating system environment, it is necessary to construct the pseudo device driver. Even when the user process A on the OS A and the user process B on the OS B attempt to user the different DMA requestors at the same time, the pseudo device driver always receives the access requests from the user processes A and B. As a result, the pseudo device driver will become a bottleneck and consequently causes overheads. Furthermore, when the operating systems are switched, the overhead by the context switch of the pseudo device driver will occur.

Figure 16:
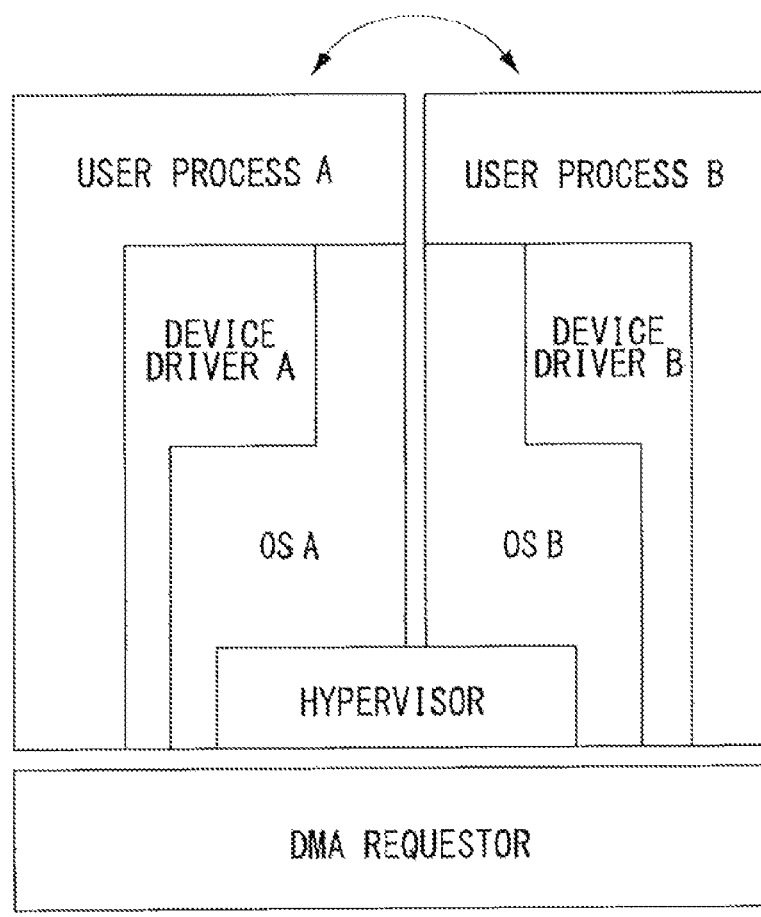
FIG. 16 is a schematic diagram to show a relationship between a user process, a DMA requestor, and a device driver in a multi-operating system environment according to an embodiment of the present invention.

FIG. 16 is a schematic diagram to show a relationship between a user process, a DMA requestor, and a device driver in a multi-operating system environment according to an embodiment of the present invention. Likewise, in this figure, the two operating systems called OS A and the OS B run on the hypervisor; however the user processes can access the DMA address space without relying on the device drivers as in FIG. 12. The device driver A and the user process A will be executed when the OS A is running, which the device driver B and the user process B will be executed when the OS B is running. The user process A can perform a DMA transfer without relying on the device driver A.

Therefore even if the context switch occurs from the OS A to the OS B, although the user process A becomes unable to use the device driver, the user process A still can continue the DMA transfer.

In order to make the context switch from the OS A to the OS B happen during user process A performing DMA transfer by without using the device driver A, the hypervisor does not have to wait until the DMA transfer is completed. Therefore, the DMA transfer to the DMA requestor a by the user process A on the SPU 116a and the DMA transfer to the DMA requestor b by the user process B on the SPU 116b can be executed in parallel and simultaneously.

More specifically, the hypervisor is provided a function for managing the IOID (hereinafter referred to as "IOID management driver"). The IOID management driver assigns an IOID to the device driver on each operating system according to the above-mentioned method. To perform a DMA transfer, the user process first issues a request to the device driver running on the operating system that the user process relies on. The device driver on each operating system can handle the DMA requestor within a range permitted through the IOID, regardless of the operation of another operating system. The hypervisor maps the DMA requestor d1 and the user process u22 to the same data area 332 beforehand, for instance, when the system is started up. Once this initial setting is done, the user process u22 and the DMA requestor d1 can perform DMA transfer without relying on the device drivers and the operating system. If another user process u20 requests to use the DMA requestor d1, the hypervisor can map the user process u20 to the data area 332 in which the DMA requestor d1 has been mapped.

According to the model described above, even if the user process A on the operating system A and the user process B on the operating system B uses the same DMA requestor, the IOID-based mechanism can strictly manage the privileged of the operation between them. It eliminates the need for a pseudo device driver. Therefore, the overhead caused by a pseudo device driver can be eliminated. In addition, when the user process A on the operating system A and the user process B on the operating system B attempt to use different DMA requestors simultaneously, the access requests from the user processes A and B can be executed in parallel and simultaneously. Therefore, the parallelism in the multi-core system can be greatly increased. Furthermore, when the operating systems are switched, it is not necessary to rewrite the IOID MMU setting registers 328 and the IOID translation table 260 and so on.

By employing the methods according to the present embodiments as described above, all of the DMA requestors can be placed under the total management of the I/O access control apparatus 300, using the IOIDs. Accordingly, the I/O access control apparatus 300 can prevent beforehand any unauthorized access from the external DMA requestors. No matter which kind of product a DMA requestor introduced into the information processing apparatus 100 is and no matter what policy is implemented to set the DMARIDs, the command transmit auxiliary apparatus 200 can append unique IOIDs to the DMA requestors under management. As was explained with reference to FIG. 6, the IOID, SEG_ADDR or MA_MASK can be arbitrarily set through privileged software. As a result, no matter how many or what kind of DMA requestors exist externally, the respective DMA requestors can be integrally managed by referring to the IOIDs of the access requesting commands 162.

According to such a processing method, the privileged software can place a device driver that controls DMA requestors, under control. In a conventional case of two-layer OS model composed of kernel layer and user layer, the device driver is of a lower layer than the user layer, so that a storage region is accessed by directly specifying a physical address. In contrast therewith, the three-layer model as in the present embodiment allows the access to the management space by a logical address. This is because the device driver does not directly access the storage area but, instead, it is operated in a software layer different from the privileged software. The privileged software sets a logical address in the address region 170 according to the type of OS operated in the kernel layer. For instance, suppose that the OS-A and the OS-B operate on the kernel layer. At the time of operation under OS-A, the privileged software may set the first translation table 180 and second translation table 182, in response to the OS-A. At the time of operation under OS-B, the privileged software may set them in response to the OS-B. Under such a multi-OS circumstance, the logical address designated by the DMA requestor can be converted into a different physical address according to the OS.

The processing method according to the present embodiments is also advantageous in that the development efficiency for programmers can be improved. If a program is created for controlling the I/O device 160, such as a device driver program, logical addresses will be used. And if a scheme of IOIDs is followed, an abstracted environment that is independent from other software can be provided, so that the burden on the development can be reduced.

Once the privileged software has set the first translation table 180 and the second translation table 182, the access permission/denial and the access condition by use of access attribute information can be managed in units of page. Hence, the I/O access control apparatus can be meticulously controlled by merely referring to these tables.

In recent years, many of commercial programs are prepared as a set of software modules provided from a number of programmers or third parties and therefore the access control for memory requires all the more accurate design. Accordingly, the method described in the present embodiment is effective in meeting such a demand.

The device driver can use the logical addresses. Thus, the DMA requestor can perform the data transfer directly and continuously on an area, for use with data transfer, which is noncontiguous on a physical address secured by software of a user layer but is contiguous on a logical address per page.

In the conventional methods, the DMA requestor can use physical addresses only. Thus, if the data transfer area is noncontiguous on a physical address per page, the data transfer of DMA needs to be segmented in accordance with such a noncontiguous area. Alternatively, OS needs to manage the area in advance so that the physical address is contiguous in the data transfer area used by the DMA requestor.

Furthermore, the first translation table 180 or the second translation table 182, provided as an address translation table, contains address attribute information which determines the access permission/denial by IOIDs and access method. As a result, each process such as the address translation and access permission/denial determination can be executed efficiently. This is because if data necessary for the address translation are contained in the refilled partial translation table, a process such as access permission/denial determination or specification of access condition can be done using its partial translation table.

The user process can directly control the DMA transfer without relying on the other software such as the device driver or the like. Therefore, the DMA transfer by the user process can be speeded up. The operating system makes a setting in the MMU 334 or the like on which user process being permitted to access which area in the DMA address space. By this setting, the access range of the DMA address by the user process is restricted so that the operation stability of the overall information processing apparatus 100 can be ensured. In summary, even though the user process can directly control the DMA transfer without using the device driver running in a privileged level on the CPU, the robustness of the overall system still can be maintained. In particular, in a multi-core system, a plurality of DMA transfers can be executed in parallel, when each user process performs its own DMA transfer. Furthermore, when multi-operating systems are being used, the mechanism based on the IOIDs can facilitate the DMA transfer in a safe manner and in a low overhead, without constructing any pseudo device driver.

The present invention has been described based on the embodiments. These embodiments are merely exemplary, and it is understood by those skilled in the art that various modifications to the combination of each component and process thereof are possible and that such modifications are also within the scope of the present invention.

What is claimed is:

1. A memory access control system, comprising:
   (a) an I/O access control apparatus comprising:
      a command receiver, which receives from an external DMA transfer requesting entity a control command that contains an address to be accessed and an ID for identifying the DMA transfer requesting entity, the address to be accessed being in a DMA address space that is a memory area used for a DMA transfer, where the DMA address space utilizes double-mapping of a DMA address both to a respective logical address that has been translated by the address translation unit and to a DMA requestor space for a respective DMA transfer requesting entity; and
      an access decision unit, which determines whether access of the DMA transfer requesting entity is permitted or not, by referring to an access permission/denial determination table that associates an address in the DMA address space with the ID of the DMA transfer requesting entity that is to be permitted to access the area specified by the address; and
      an access processing unit, which executes access of the DMA transfer requesting entity to the DMA address space, on the condition that the access has been permitted by said access decision unit; and
   (b) a process control apparatus comprises:
      a mapping unit, which sets a mapping table that associates a logical address space of a user process with the DMA address space;
      a processing unit for executing a main process and on which a device driver runs;
      a sub-processing unit for executing as a sub-process a user process assigned by the processing unit during the execution of the main process, and
      an address translation unit, which is configured as a part of the sub-processing unit and which translates a logical address into a physical address in the DMA address space when the user process contains instructions to access the DMA address space by specifying the logical address, so as to allow the user process to directly access the DMA address space without relying on the device driver that runs on the processing unit, where the address translation unit allows the user process to directly access a DMA requestor space when accessing the DMA address space, without relying on a device driver that is run on the processing unit, when the user process executed in the sub-processing unit issues instructions for access to the DMA address space.

2. The memory access control system according to claim 1, wherein the mapping unit of the process control apparatus associates the logical address space of the user process with the DMA address space in such a manner that one area to be accessed by an operating system and another area to be accessed by the user process do not overlap with each other in the DMA address space.

3. The memory access control system according to claim 1, wherein the access decision unit of the I/O access control apparatus rejects an access of the DMA transfer requesting unit to a predetermined memory area secured for an operating system.

4. The memory access control system according to claim 1, wherein
   the processing unit switches a plurality of operating systems in a time-sharing manner to execute one of the operating systems; and
   the sub-processing unit continues to allow the access of the user process even if the switching of the operating systems occurs during access to the DMA address space in the user process executed by the sub-processing unit.

5. A method for controlling memory access, comprising:
   receiving from an external DMA transfer requesting entity a control command that contains an address to be accessed and an ID for identifying the DMA transfer requesting entity, the address to be accessed being in a DMA address space that is a memory area used for a DMA transfer, where the DMA address space utilizes double-mapping of a DMA address both to a respective logical address that has been translated by the address translation unit and to a DMA requestor space for a respective DMA transfer requesting entity;
   determining whether access of the DMA transfer requesting entity is permitted or not, by referring to an access permission/denial determination table that associates an address in the DMA address space with the ID of the DMA transfer requesting entity that is to be permitted to access the area specified by the address;
   executing access of the DMA transfer requesting entity to the DMA address space, on the condition that the access has been permitted by said determining step;
   executing a main process by a processing unit, on which a device driver runs;
   executing, by a sub-processing unit, a user process, which is assigned by the processing unit as a sub-process during the execution of the main process;
   setting a mapping table that associates a logical address space of the user process with the DMA address space; and
   translating, by a part of the sub-processing unit, a logical address into a physical address in the DMA address space when the user process contains instructions to access the DMA address space by specifying the logical address, so as to allow the user process to directly access the DMA address space without relying on the device driver that runs on the processing unit, where translation is configured as a part of the sub-processing unit and allows the user process to directly access a DMA requestor space when accessing the DMA address space, without relying on a device driver that is run on the processing unit, when the user process executed in the sub-processing unit issues instructions for access to the DMA address space.

6. A computer program product embodied on non-transitory computer-readable recording medium having a computer program for controlling memory access of a sub-processing unit, the program comprising:
   a code module for mapping an address space of a DMA transfer requesting entity to a predetermined memory area;
   a code module for further mapping an address space of a user process run by the sub-processing unit, to which a privilege of controlling the DMA transfer requesting entity is given, to the same predetermined memory area;
   a code module for performing data exchange via the predetermined area that has been mapped from both the user process and the DMA transfer requesting entity, by utilizing the user process of the sub-processing unit and the process of the DMA transfer requesting entity, user process accessing the DMA transfer requesting entity without relying on a device driver, which is run on a processing unit other than the sub-processing unit; and a code module for, when any one of a plurality of user processes requests a privilege of controlling any one of a plurality of DMA transfer requesting entities, performing data exchange between the requesting user process and the requested DMA transfer requesting entity by mapping the requesting address space of the user process to the memory area which has been mapped to the address space of the requested DMA transfer requesting entity.

* * * * *